United States Patent [19]

Seki et al.

[11] Patent Number: 5,365,274
[45] Date of Patent: Nov. 15, 1994

[54] VIDEO SIGNAL CONVERTING APPARATUS WITH REDUCED PROCESSING FOR ALIASING INTERFERENCE

[75] Inventors: Yoshio Seki, Osaka; Masaki Tokoi, Neyagawa; Atsushi Ishizu, Takatsuki; Yoichiro Miki, Kawachinagano, all of Japan

[73] Assignee: Matsushita Electric Industrial Co., Ltd., Osaka, Japan

[21] Appl. No.: 61,704

[22] Filed: May 13, 1993

[30] Foreign Application Priority Data

May 13, 1992 [JP] Japan .................................. 4-120232
Nov. 18, 1992 [JP] Japan .................................. 4-308546

[51] Int. Cl.[5] ............................................. H04N 7/01
[52] U.S. Cl. ..................................... 348/458; 348/427
[58] Field of Search ............... 358/138, 167, 140, 141; 348/458, 427; H04N 7/01

[56] References Cited

U.S. PATENT DOCUMENTS 4,979,037 12/1990 Mizutani et al. ................. 358/138 X
4,979,040 12/1990 Masumoto ........................... 358/138
5,018,010  5/1991 Masumoto ....................... 358/167 X
5,144,427  9/1992 Kitaura et al. .................. 358/138 X
5,168,358 12/1992 Ishizu et al. ....................... 358/140

OTHER PUBLICATIONS

Y. Izumi, et al., "Development of the MUSE-525 Line Standard Converter", vol. 44, No. 6, *The Journal of the Institute of Television Engineers of Japan*, pp. 705-712 (1990).

S. Yanagase et al., "Introduction on NTSC/MUSE Converter", *Television Technology*, pp. 40-45 (Oct. 1989).

Y. Izumi et al., "A Method of Moving Area Detection Technique in a MUSE Decoder", vol. J75-B-I, No. 4, *The Transaction of the Institute of Electronics, Information and Communication Engineers*, pp. 235-243 (Apr. 1993).

Primary Examiner—Victor R. Kostak
Attorney, Agent, or Firm—Ratner & Prestia

[57] ABSTRACT

A video signal conversion apparatus for converting high definition television signals band-width compressed by offset sub-sampling to a conventional standard television signal while removing aliasing interference caused by offset sub-sampling and using less memory capacity than is conventionally required is provided. The image of the sub-sampled signal is restored from the sampling points in the current field by an intra-field interpolation circuit, and the number of scan lines is reduced to the same number in the standard television signal format by a scan line number conversion circuit. Half of the pixels in the current field are then substituted into the signal for the one previous frame for inter-frame interpolation by a signal selector which alternately selects a signal from the scan line number conversion circuit and a signal from field memories, and a time-base operation for removing aliasing interference at the standard television signal rate is executed.

22 Claims, 25 Drawing Sheets

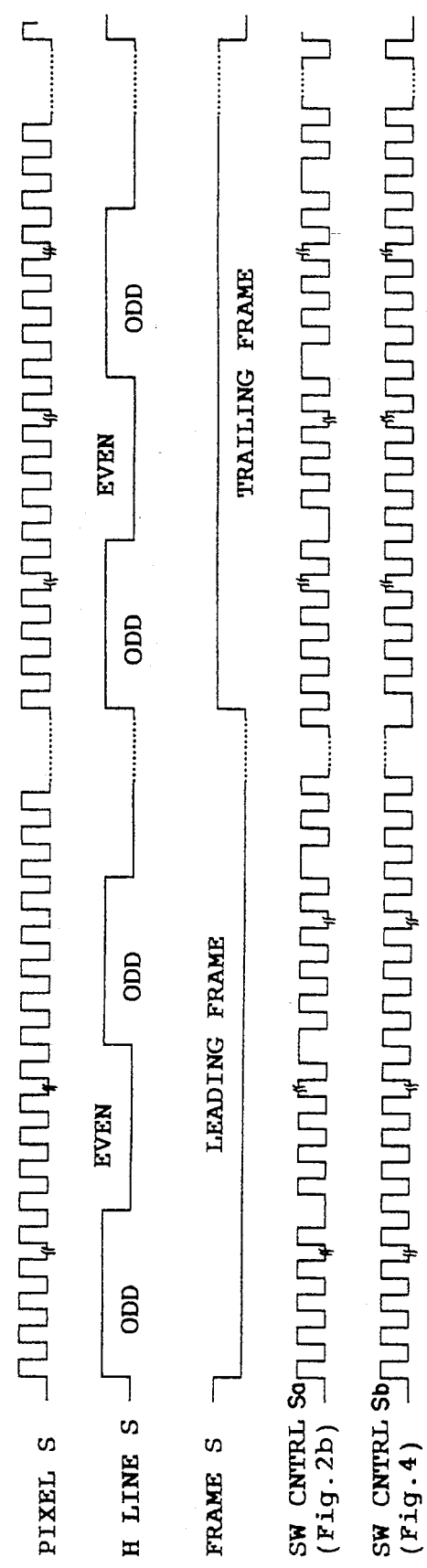

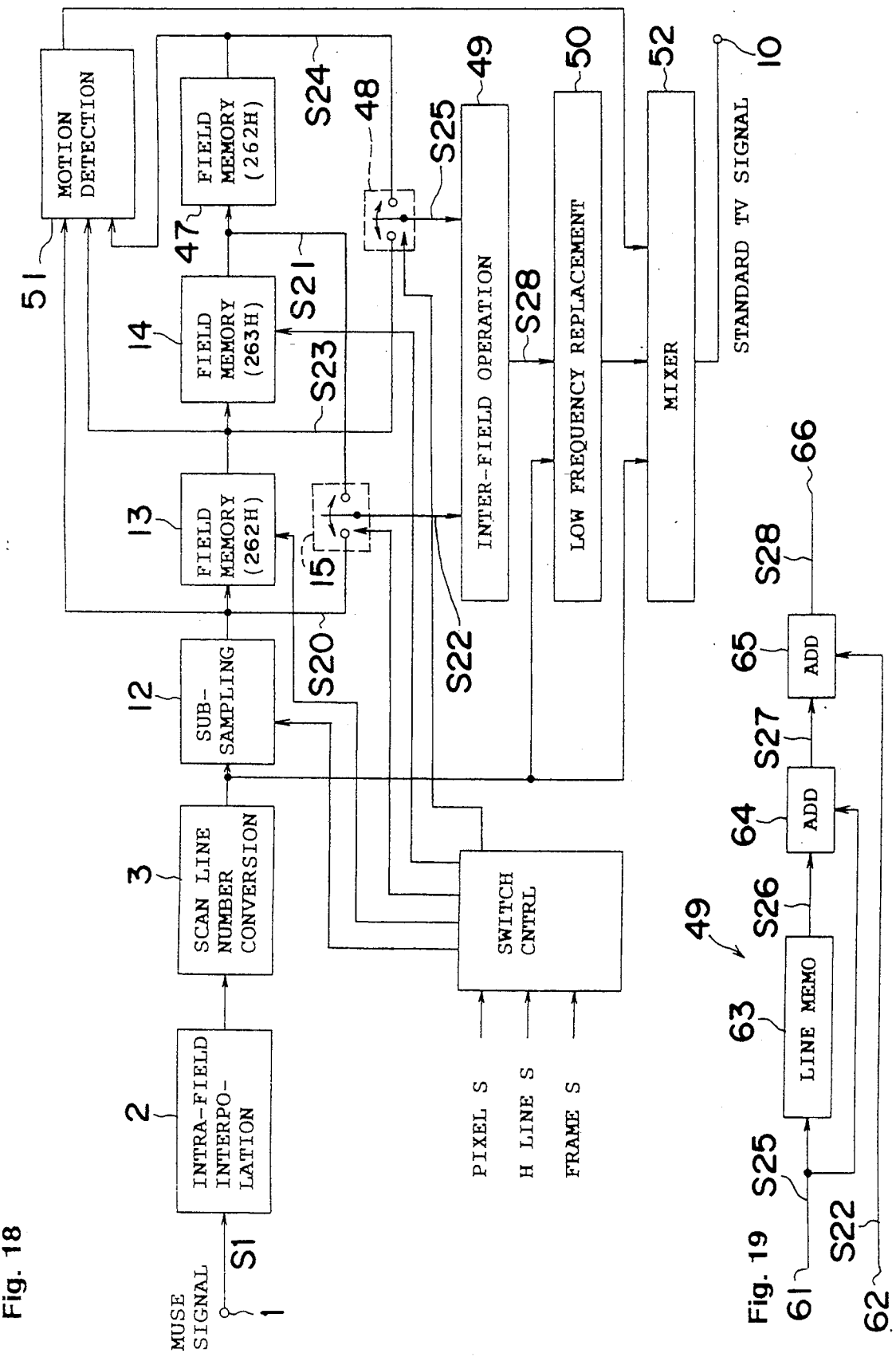

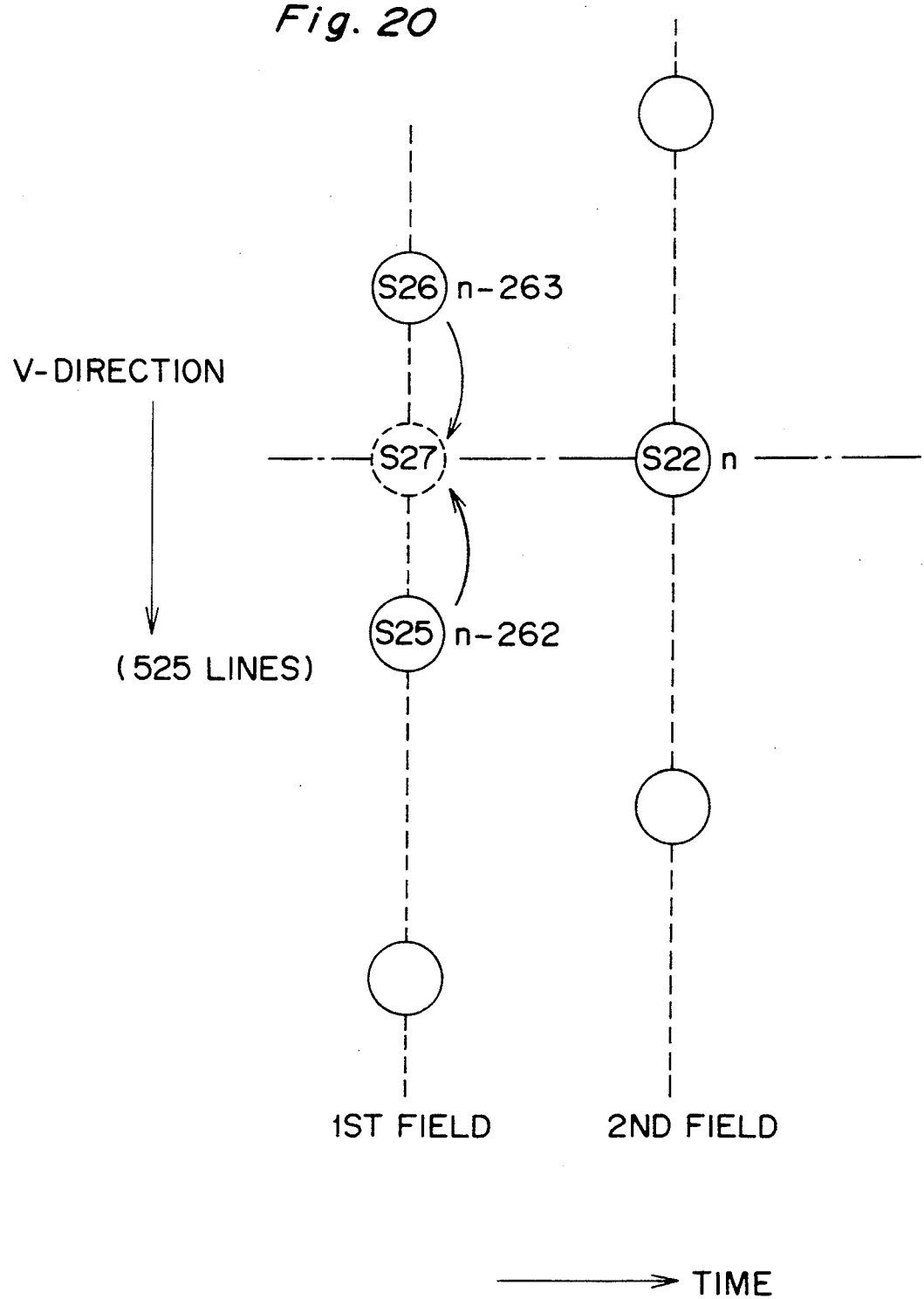

VIDEO SIGNAL CONVERTING APPARATUS WITH REDUCED PROCESSING FOR ALIASING INTERFERENCE

BACKGROUND OF THE INVENTION

1. Field of the Invention

The present invention relates to a video signal converting apparatus for converting high definition television signals band-width compressed by offset sub-sampling to an existing standard television signal.

2. Description of the Prior Art

High definition television (HDTV) signals occupy the bandwidth above 20 MHz, and band-width compression is necessary for direct satellite broadcasting or other similar means. An effective technology for significantly compressing the HDTV signal band-width uses sub-Nyquist sampling for band-width compression, and two such methods have been proposed: MUSE (Multiple Sub-Nyquist sampling Encoding) and HD-MAC (High Definition-Multiple Analogue Component) methods. (See Y. Ninomiya, et al., An HDTV Broadcasting System Utilizing a Bandwidth Compression Technique - MUSE (IEEE Trans. Vol. BC-33, No. 4, p. 130 (1987)), and F. W. P. Vreeswijk, et al., HD-MAC Coding for Compatible Broadcasting of HDTV Signals (Symposium Record Broadcast Session 1989, pp. 37–53).

As shown in FIG. 22, these methods use inter-field and inter-frame offset sub-sampling to process four fields in one sampling phase so that each field transmits only ¼ the total sampling points of the source signal. More specifically, according to the MUSE system, the first field in the first frame (referred to as a leading frame) carries pixel data "A" aligned in every other pixel positions in odd numbered horizontal lines; the second field in the leading frame carries pixel data "B" aligned in every other pixel positions in even numbered horizontal lines; the first field in the second frame (referred to as a trailing frame) carries pixel data "C" aligned in the remaining pixel positions in the odd numbered horizontal lines; and the second field in the trailing frame carries pixel data "D" aligned in the remaining pixel positions in the even numbered horizontal lines.

The receiver then restores the source signal by interpolating the sampling points that are not transmitted (the "unsampled points" below) from the received sampling points.

For forming stationary areas of a television picture, the pixel data sampled in the current field are interpoled with the pixel data obtained in three previous fields, as shown in FIG. 22 to form a complete image at the stationary areas.

For forming moving areas of a television picture, only the pixel data sampled in the current field are used.

Because the interpolation methods used for stationary and moving areas are different, the receiver must detect motion in the image to restore the original image by mixing signals processed as stationary images and signals processed as moving images according to the amount of detected motion.

A television receiver with a built-in decoder (signal processor) performing this interpolation process is needed to receive HDTV broadcasts, but these are currently extremely expensive. It will be some time before such televisions become common in the average household. MUSE-NTSC converters, which convert MUSE-format HDTV signals to the current standard NTSC signal are therefore available to enable display and recording of MUSE-format HDTV broadcasts using the standard format televisions and video cassette recorders (VCR) that are already common in the home. Several video signal converters for outputting the standard format TV signal after image interpolation have been proposed.

The simplest converters restore the image using intra-field interpolation whereby only the unsampled points are interpolated from the intra-field sampling points using a two-dimensional (2D) filter. This process is essentially the same as the moving image process of the MUSE decoder. The signal transmission characteristics of the intra-field interpolation circuit are shown in the frequency characteristics graph of FIG. 23a. In a stationary image, high resolution components are aliased to a low frequency band by two types of offset sub-sampling for transmission in the MUSE format as shown by the frequency characteristics graph in FIG. 23b. As a result, the aliased high resolution component is reproduced as a low frequency component and image deterioration known as "aliasing interference" occurs from interpolation by an intra-field interpolation circuit with a signal pass band width as shown in FIG. 23a.

In the MUSE-NTSC converter, aliasing interference is removed by time-base inter-field and inter-frame processing to achieve high image quality.

One video signal converter offering high image quality is described in Development of a MUSE-NTSC Converter, The Institute of Television Engineers of Japan Annual Conference 1991 (ITEC '91, 14–9).

In a conventional video signal converter as shown in FIG. 24, there are two interpolation circuits, for stationary and moving areas, as in the MUSE decoder, and images are restored by mixing the image areas processed as stationary and moving areas according to the detected movement in the image.

In this converter, the moving image interpolation circuit uses intra-field interpolation. The stationary image interpolation circuit, however, applies inter-frame interpolation to the input MUSE signal to substitute half of the pixels in the current field into the signal delayed one frame period, and uses inter-field averaging thereafter. Because of this inter-frame interpolation process, the high resolution component aliased as shown in FIG. 23b becomes the aliased component resulting from inter-field offset sub-sampling as shown in FIG. 13. This component is then removed by the inter-field averaging process. Aliasing interference caused by offset sub-sampling is thus removed in the resulting signal.

The outputs of two interpolation circuits are therefore selectively used according to the amount of movement detected in the image by the movement detection circuit. The restored image is free of aliasing interference in the stationary image areas, and such image deterioration as double images (ghosts) do not occur in the moving images. The number of scan lines and other parameters are then adjusted to complete the conversion to a standard television signal.

The problem with this technology, however, is that the same amount of memory used by a MUSE decoder is required for stationary image processing at the HDTV signal rate, and the converter is therefore expensive.

In addition, vertical resolution deteriorates because field aliasing interference is removed by the field averaging process.

SUMMARY OF THE INVENTION

Therefore, an object of the present invention is to provide a video signal converting apparatus for removing aliasing interference caused by inter-frame offset sub-sampling, which is a cause of image deterioration, using less than one-half the memory capacity required by the prior art.

A further object is to provide a video signal converting apparatus for removing aliasing interference caused by inter-field offset sub-sampling without degrading the vertical resolution.

To achieve the first object of the invention, a video signal converting apparatus according to the present invention comprises an intra-field interpolation means for interpolating the unsampled points from the intra-field sampling points of the sub-sampled signal using a high definition television signal band-width compressed by offset sub-sampling as the input signal, a scan line number conversion means for converting the number of scan lines in the intra-field interpolated signal to the same number of scan lines in the conventional standard-format television signal, and an inter-frame interpolation means for interpolating the output signal of the scan line number conversion means by means of substituting half of the pixels of the current field into the one frame-delayed output signal of the scan line number conversion means.

To achieve the second object of the invention, a second embodiment of the invention comprises an intra-field interpolation means for interpolating the unsampled points from the intra-field sampling points of the sub-sampled signal using a high definition television signal band-width compressed by offset sub-sampling as the input signal, a scan line number conversion means for converting the number of scan lines in the intra-field interpolated signal to the same number of scan lines in the conventional standard-format television signal, an inter-frame interpolation means for interpolating the output signal of the scan line number conversion means by means of substituting half of the pixels of the current field into the one frame-delayed output signal of the scan line number conversion means, an inter-field operating means for averaging the inter-frame interpolation means output signal and the inter-frame interpolation means output signal delayed one field period, and a low frequency replacement means for replacing the low frequency component of the scan line number conversion means output signal with the low frequency component of the inter-field operating means output signal.

Thus comprised, the first embodiment of the invention applies intra-field interpolation to the HDTV signal band-width compressed by offset sub-sampling, converts the number of scan lines to the same number in the current standard television signal format, and then applies interframe interpolation to replace pixels in the one previous frame with half the pixels in the current field. By thus using inter-frame interpolation at the signal rate of the current standard television signal format, frame aliasing interference can be removed with less memory capacity.

In addition to the operation of the first embodiment, the second embodiment of the invention limits inter-field processing to the high frequency component only, thereby improving the frequency characteristics of the horizontal low frequency band - vertical high frequency band, and thus removes field aliasing interference without degrading vertical resolution.

BRIEF DESCRIPTION OF THE DRAWINGS

The present invention will become more fully understood from the detailed description given below and the accompanying diagrams wherein:

FIG. 18 is a block diagram of a video signal converting apparatus according to a fourth modification of the second embodiment of the invention, FIG. 19 is a block diagram of the inter-field operating circuit in the fourth modification, FIG. 20 is a scan line diagram used to describe the operation of the inter-field operating circuit of the fourth modification.

DESCRIPTION OF PREFERRED EMBODIMENTS

The first embodiment of a video signal conversion apparatus according to the invention is described below with reference to the block diagram in FIG. 1a.

Figure 1A:
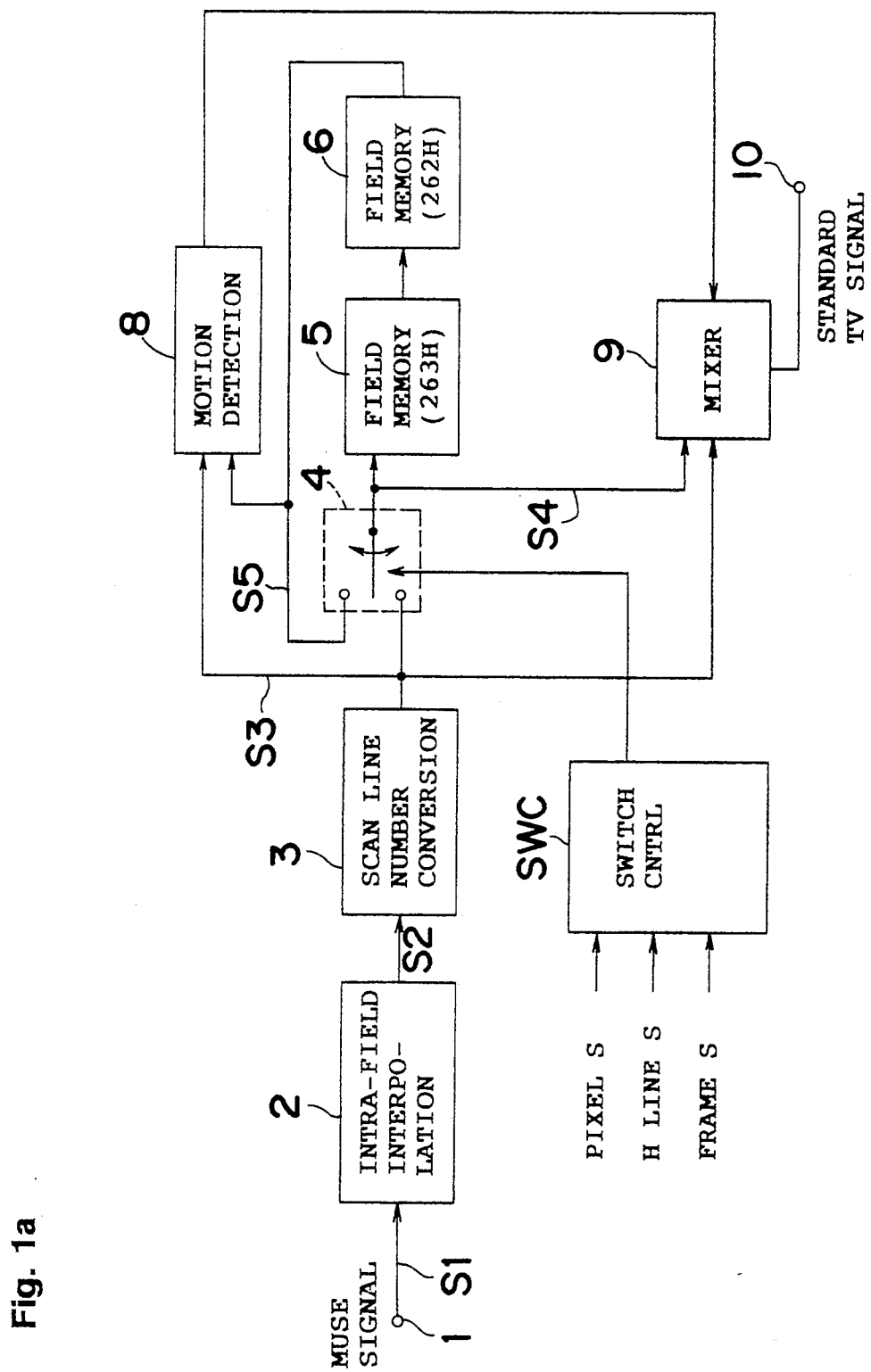
FIG. 1a is a block diagram of a video signal converting apparatus according to the first embodiment of the invention.

As shown in FIG. 1a, this video signal conversion apparatus comprises a MUSE signal input terminal 1 for inputting the MUSE signal, an intra-field interpolation circuit 2, a scan line number conversion circuit 3, a signal selector 4 operated by a switch control circuit SWC, field memories 5 and 6, a motion detection circuit 8, a mixer 9, and a standard TV signal output terminal 10. Field memories 5 and 6 are formed by FIFO arrangement and have capacity for storing 263 H lines and 262 H lines, respectively.

Figure 1C:
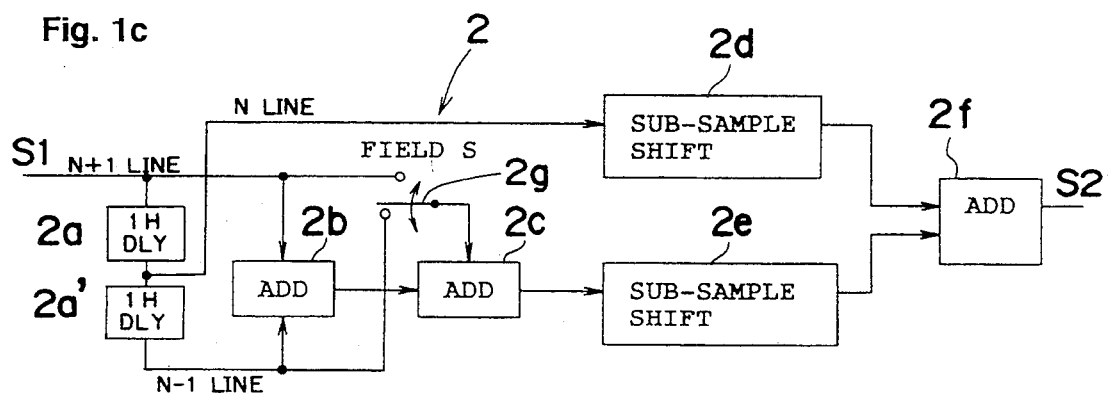
FIG. 1c is a block diagram of an intra-field interpolation circuit 2 shown in FIG. 1a, FIG. 1d is a block diagram of a scan line number conversion circuit 3 shown in FIG. 1a, FIGS. 2a and 2b taken together as shown in FIG. 2 show a partial raster image used to describe the operation of the first embodiment.

The intra-field interpolation circuit 2 has, as shown in FIG. 1c, a 1 H delay circuits 2a and 2a', adders 2b, 2c and 2f, a switch 2g and sub-sample shift circuits 2d and 2e. The detail of intra-field interpolation circuit 2 is disclosed in detail in a Japanese magazine "Television Gakkaishi (The Journal of the Institute of Television Engineers of Japan)" Vol. 44, No. 6, pp705–712 (1990) by Izumi et al, in article "Development of the MUSE-525 Line Standard Converter" by Y. Izumi et al. and the disclosure thereof is incorporated herein by reference. The intra-field interpolation circuit 2 receives original signal S1 and produces interpolated signal S2.

Figure 2:
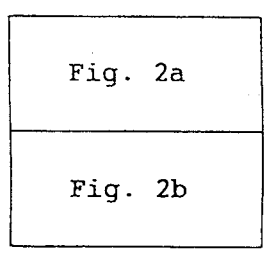
Figure 2A:
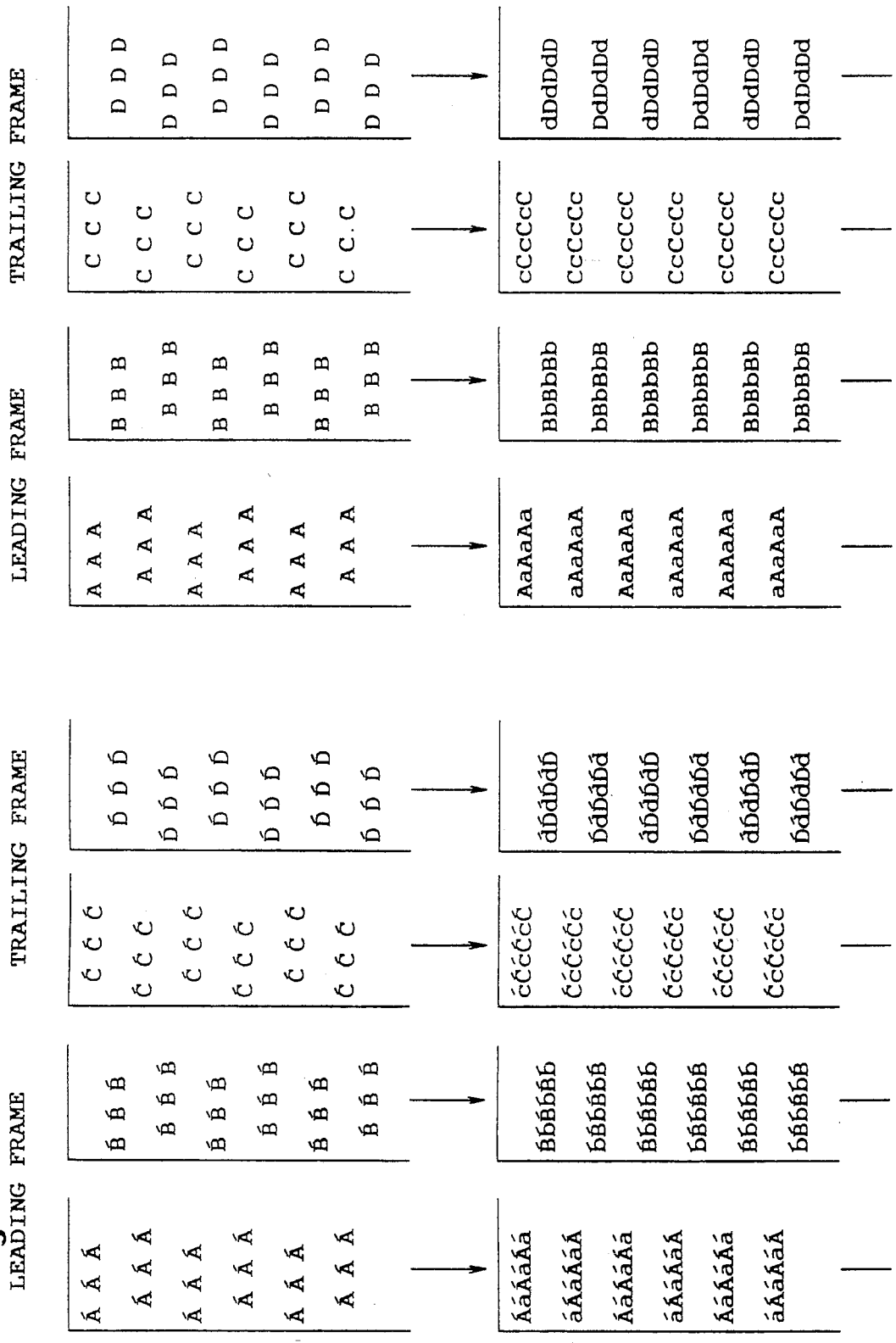

As shown in FIG. 2a, the original signal S1 provides pixel data such that: the first field in the first frame (referred to as a leading frame) carries pixel data "A" ("A" with a prime indicates data obtained in a previous cycle (one cycle=two frames), and "A" without a prime indicates data obtained in the present cycle) aligned in every other pixel positions in odd numbered horizontal lines; the second field in the leading frame carries pixel data "B" aligned in every other pixel positions in even numbered horizontal lines; the first field in the second frame (referred to as a trailing frame) carries pixel data "C" ("C" with umlaut indicates data obtained in two previous cycles) aligned in the remaining pixel positions in the odd numbered horizontal lines; and the second field in the trailing frame carries pixel data "D" aligned in the remaining pixel positions in the even numbered horizontal lines. In signal S1, each line in the first and second fields in the leading frame has sampled and unsampled points occurring alternately, and each line in the first and second fields in the training frame has unsampled and sampled points occurring alternately.

As shown in FIG. 2a, the interpolated signal S2 provides pixel data having simulated data (shown by lowercase characters) inserted between original data (shown by uppercase characters). The simulated data are formed in the intra-field interpolation circuit 2 for example by taking an average between surrounding pixel data. It is to be noted that the original data are also referred to as data at sampled points and the simulated data are also referred to as data at unsampled points. Thus, it can be said that the intra-field interpolation circuit 2 interpolates data at the unsampled points from the data at the sampling points in the fields of a bandwidth compressed MUSE signal.

Figure 23A:
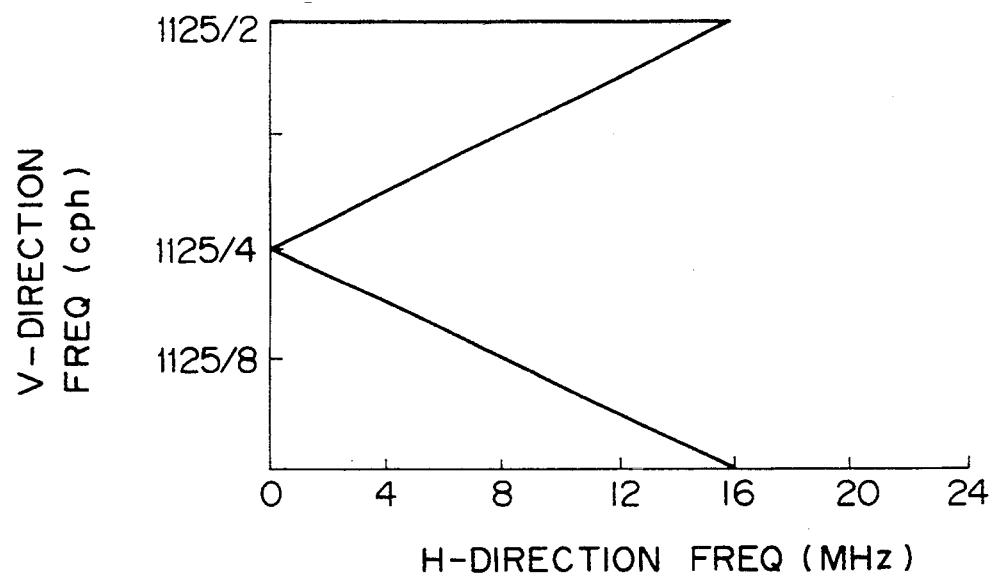
FIGS. 23A and 23B are frequency characteristics diagrams used to describe the generation of aliasing interference caused by offset sub-sampling in the MUSE format during intra-field interpolation.
Figure 23B:
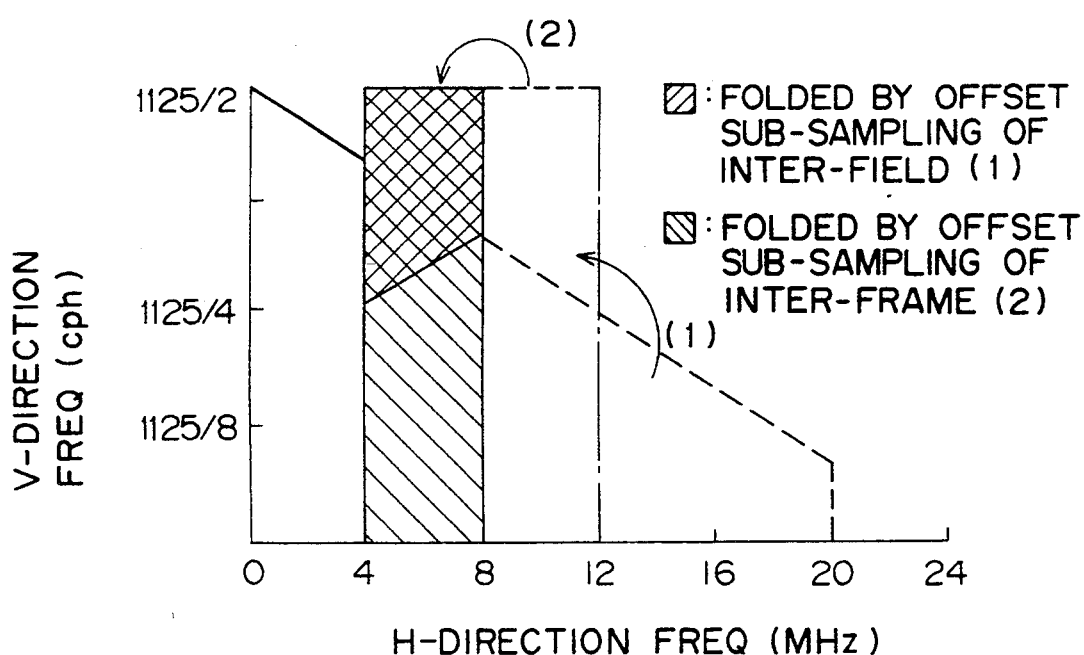

The intra-field interpolation circuit 2 is designed to limit the vertical band width of the signal as shown in FIG. 23a, and thus also functions as a prefilter for the scan line number conversion circuit 3.

Figure 1D:
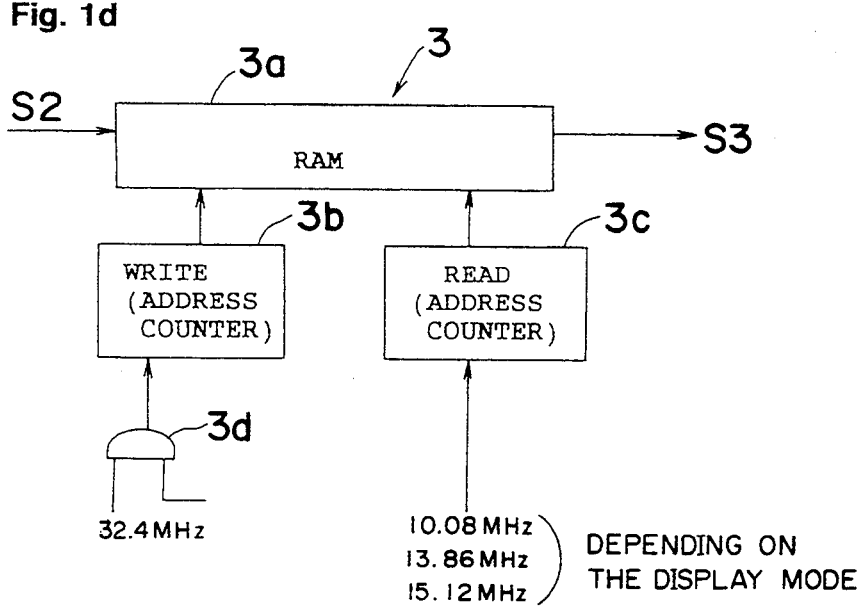
FIG. 1b is a graph showing signal waveforms for controlling the switch 4 shown in FIGS. 1a and 4.

The scan line number conversion circuit 3 reduces the number of scan lines in the HDTV signal to the number of scan lines in the standard format TV signal. The scan line number conversion circuit 3 has, as shown in FIG. 1d, a memory such as RAM 3, a write decoder 3b, a read decoder 3c and an AND gate 3d. The detail of scan line number conversion circuit 3 is disclosed in a Japanese magazine "Televi Gijutsu (Television Technology)" October 1989, pp40–45, in article "Introduction on NTSC/MUSE converter" by S. Yanagase et al, and the disclosure thereof is incorporated herein by reference. The scan line number conversion circuit 3 receives the interpolated signal S2 and produces an extracted signal S3 in which the line number is reduced, for example, to one half by eliminating every other lines in signal S2.

Figure 2B:
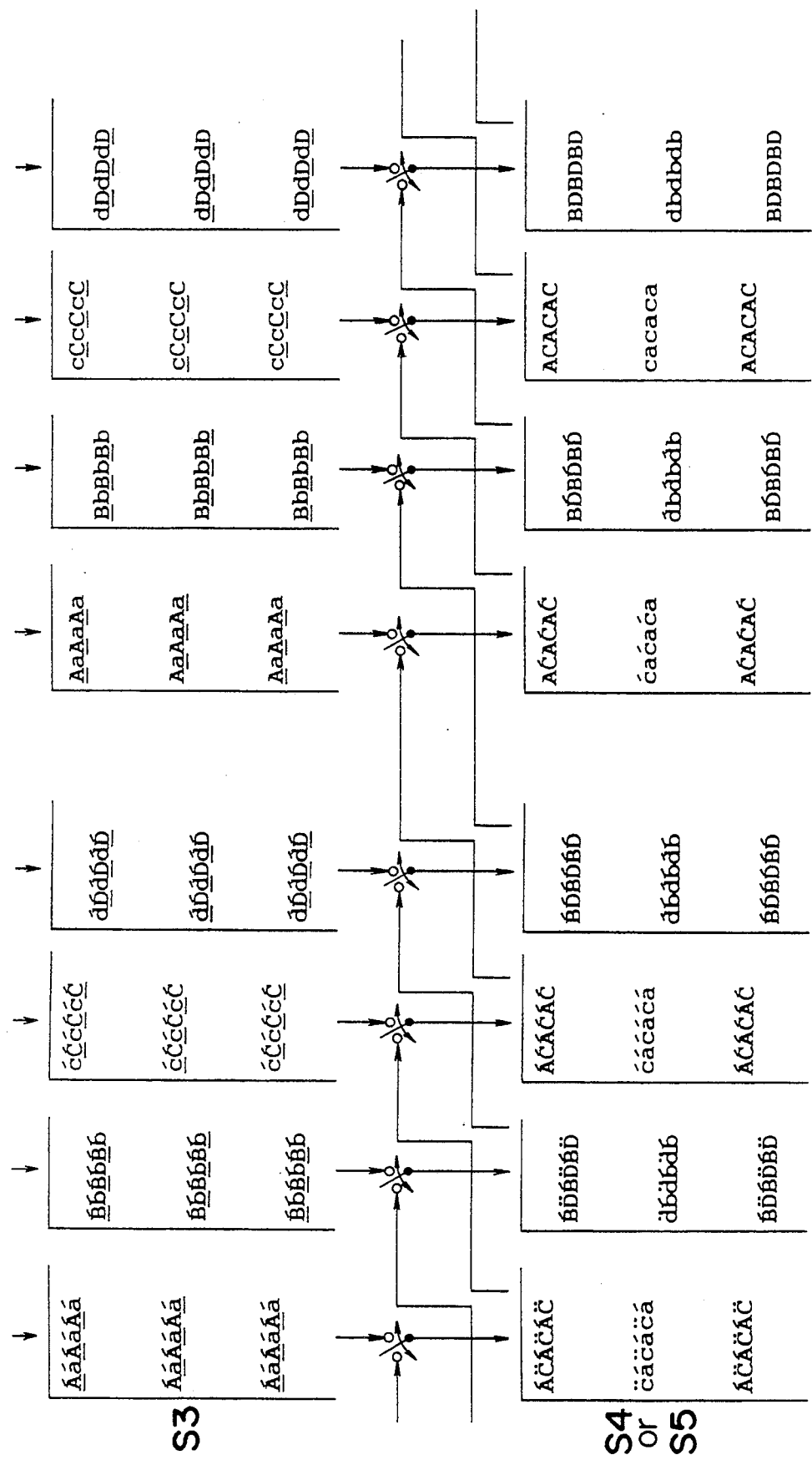

As shown in FIG. 2b, when compared with interpolated signal S2, the extracted signal S3 has every other line extracted. Thus, in RAM 3a in FIG. 1d, only one line out of two lines are written, and the line stored in RAM 3a is read out at a half the writing speed. Thus, the extracted signal S3 read out from RAM 3a is produced without any waiting.

The number of horizontal lines in the first and second fields in signal S2 are 563 and 562, respectively, thus altogether 1125; and the number of horizontal lines in the first and second fields in signal S3 are 263 and 262, respectively, thus altogether 525.

The signal selector 4 is a switch operated by a switch control signal from switch control circuit SWC so as to insert the pixel data of the previous frame delayed by the field memories 5 and 6 into the scan line number conversion circuit 3 output signal. Thus, the field memory 6 produces a delayed signal S5 which is a combination of one-frame delayed pixel data and two-frame delayed pixel data. The switch control circuit SWC receives, as shown in FIG. 1b, a pixel signal which has one pulse for one pixel in one frame, a line signal which takes HIGH and LOW during odd and even number lines, respectively, in the extracted signal S3, and a frame signal which takes LOW and HIGH during leading and trailing frames, respectively. By the use of these signals, the switch control circuit SWC produces a switch control signal Sa shown in FIG. 1b for the embodiment of FIG. 1a, and a switch control signal Sb for the embodiment of FIG. 3. In response to the switch control signal Sa, the signal selector 4 connects blocks 3 and 5 when signal Sa is HIGH, and connects blocks 6 and 5 when signal Sa is LOW. In other words, in FIG. 2b, data with underline in signal S3 are selected by the signal selector 4 and are applied to field memory 5, and the remaining signal for filling the space between the selected underlined data are selected from one frame previous data as stored in field memory 6. By alternately combining the present pixel data and one frame previous pixel data by selector 4, a new combined signal S4 is stored in memory 5. Thus, every other pixel positions in signal S3, as black squares in a checkerboard pattern, are replaced in line offset and frame offset manner. Such a replacement is herein referred to as a checkerboard replacement.

The new combined signal S4 in memory 5 is serially shifted in a FIFO (first-in first-out) manner to memory 6 which in turn sequentially produces a pixel data.

The pixel data from memory 6 is also applied to the motion detection circuit 8, the detail of which is disclosed in the Japanese magazine "Denshi-Johou-Tsushin-Gakkai-Rombunshi (The Transactions of the Institute of Electronics, Information and Communication Engineers)" Vol. J75-B-I No. 4 pp235–243 April 1993, in article "A Method of Moving Area Detection Technique in a MUSE Decoder" by Y. Izumi et al, and the disclosure thereof is incorporated herein by reference. The motion detection circuit 8 detects for each area in the image, such as each pixel position, whether or not the image has been changed from the previous cycle image. The amount of movement is evaluated in different levels such as 0, 1, 2, 3 and 4, in which 0 is for still and 4 is for rapid movement. The motion detection circuit 8 produces a motion level signal indicative of such a level which is applied to the mixer 9.

Mixer 9 receives signals S3 and S4 and the motion level signal. Mixer 9 has a first amplifier for amplifying signal S3, a second amplifier for amplifying signal S4 and an adder for adding the amplified signals. The amplification ratio ($\mu$-factor) of the first amplifier increases relatively to the increase of the motion level, and the amplification ratio ($\mu$-factor) of the second amplifier decreases relatively to the increase of the motion level. An example of the signal mixing is shown in Table 1 below.

TABLE 1

| Motion Level | 0 | 1 | 2 | 3 | 4 |
|---|---|---|---|---|---|
| Signal S3 | 0 | ¼ | ½ | ¾ | 1 |
| Signal S4 | 1 | ¾ | ½ | ¼ | 0 |

For example, when the motion level signal is 3, signals S3 and S4 are added at the ratio of 3:1 in terms of amplification.

Thus, when the image is still, signal S4 after the signal selector 4 is used 100%, and when the image is rapidly moving, signal S3 from scan line number conversion circuit 3 is used 100%.

The added signal from mixer 9 is produced from output terminal 10 as a standard television signal converted from the HDTV signal.

According to the first embodiment, the extracted components can be restored using inter-frame offset sampling by inter-frame interpolation in stationary areas because of the inter-frame correlation of the images. As a result, aliasing interference caused by inter-frame offset sampling does not occur.

Figure 24:
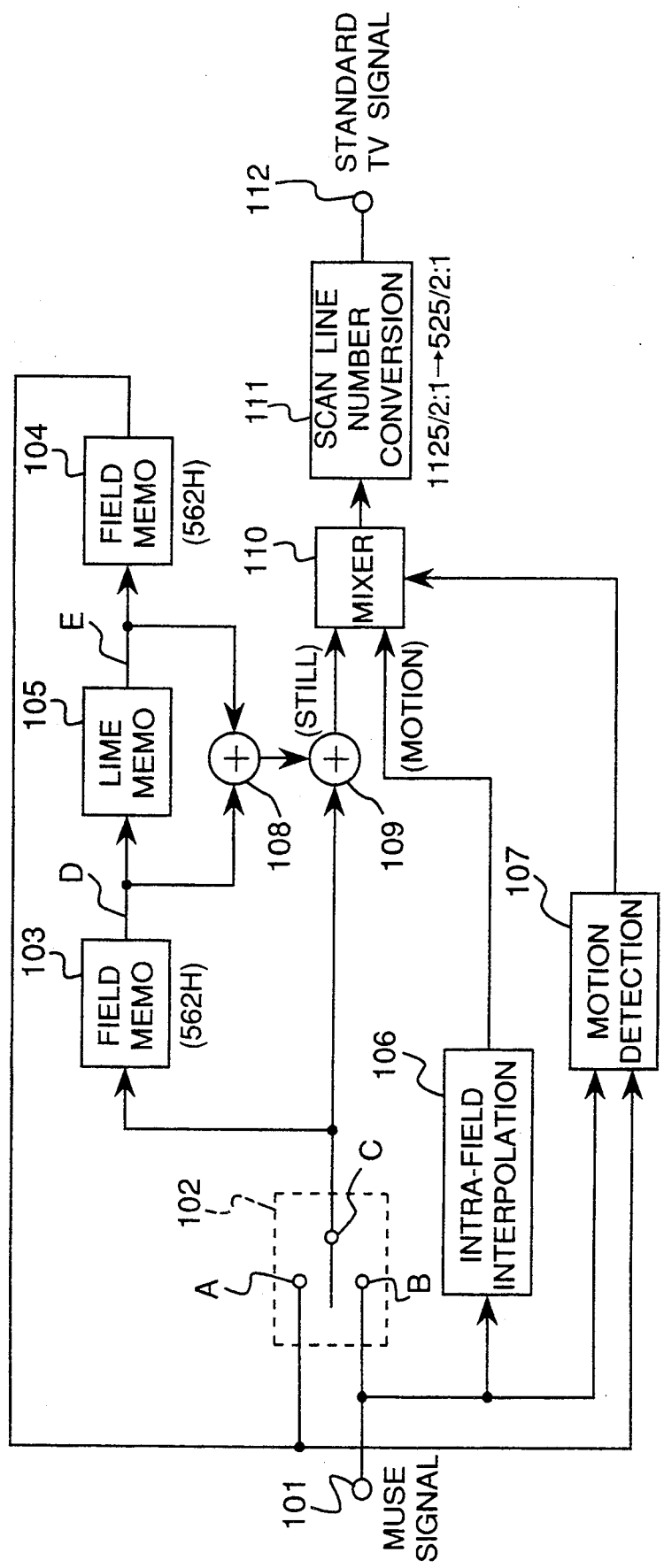
FIG. 24 is a block diagram of a prior art video signal conversion apparatus.

It is to be noted that the capacity of the field memories 5, 6 is less than half that of the prior art such as shown in FIG. 24, because the number of scan lines in the scan line number conversion circuit 3 output signal S3 is less than half the number of scan lines in the intrafield interpolation circuit 2 output signal.

The first embodiment of the invention as described above can thus remove inter-frame aliasing interference using less than half the memory capacity required by methods of the prior art by applying inter-frame interpolation processing after converting the band-width compressed HDTV signal to the same number of scan lines used in the conventional television signal.

Figure 3:
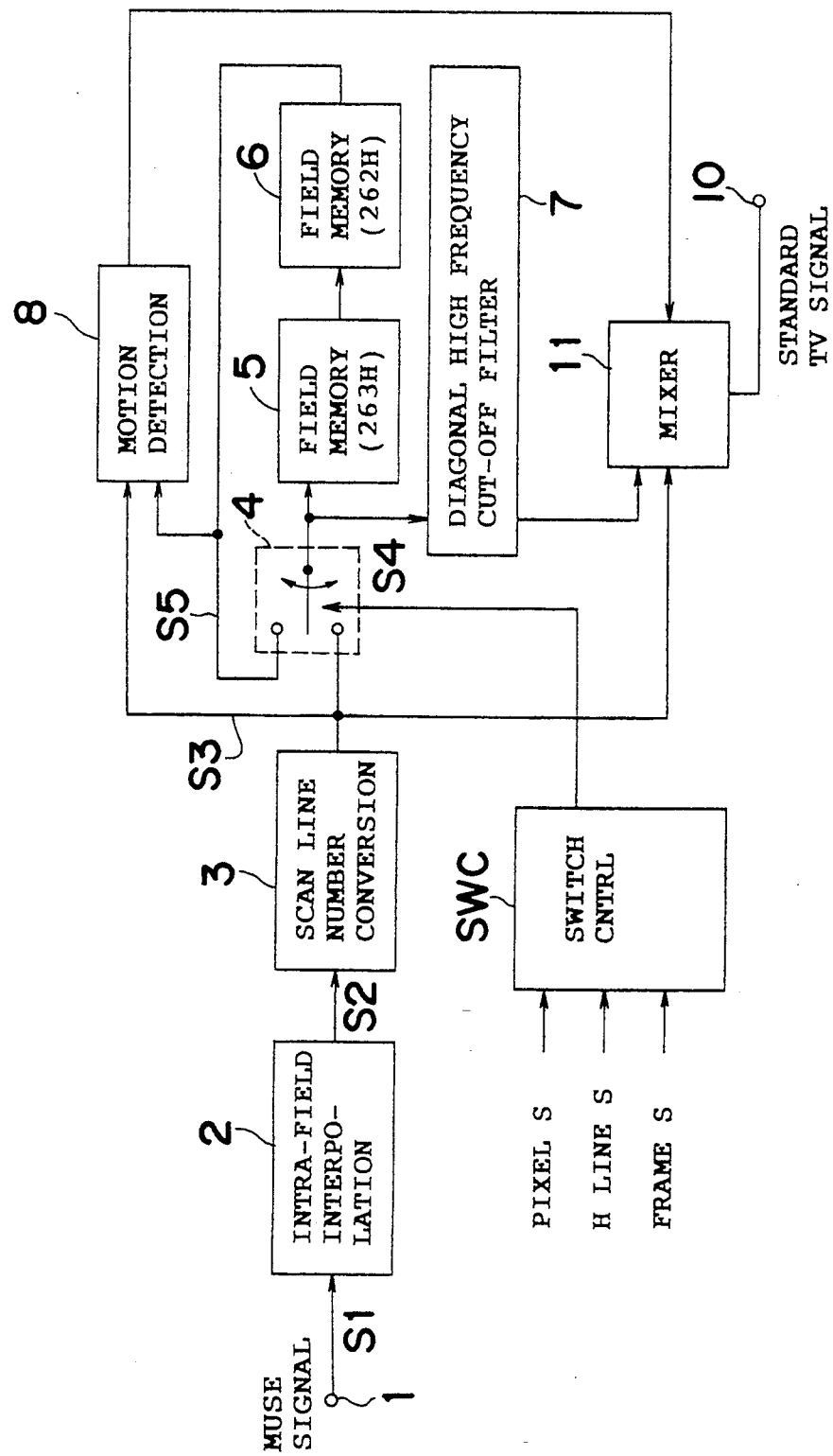
FIG. 3 is a block diagram of a video signal converting apparatus according to a first modification of the first embodiment of the invention.

FIG. 3 is a block diagram of a video signal converting apparatus according to a first modification of the first embodiment described above. The first modification of FIG. 3 differs from the embodiment of FIG. 1a in that a diagonal high frequency cut-off filter 7 is provided between the signal selector 4 and mixer 11. All other components are identical and are identified by the same reference numerals in FIGS. 1a and 3.

Figure 4:
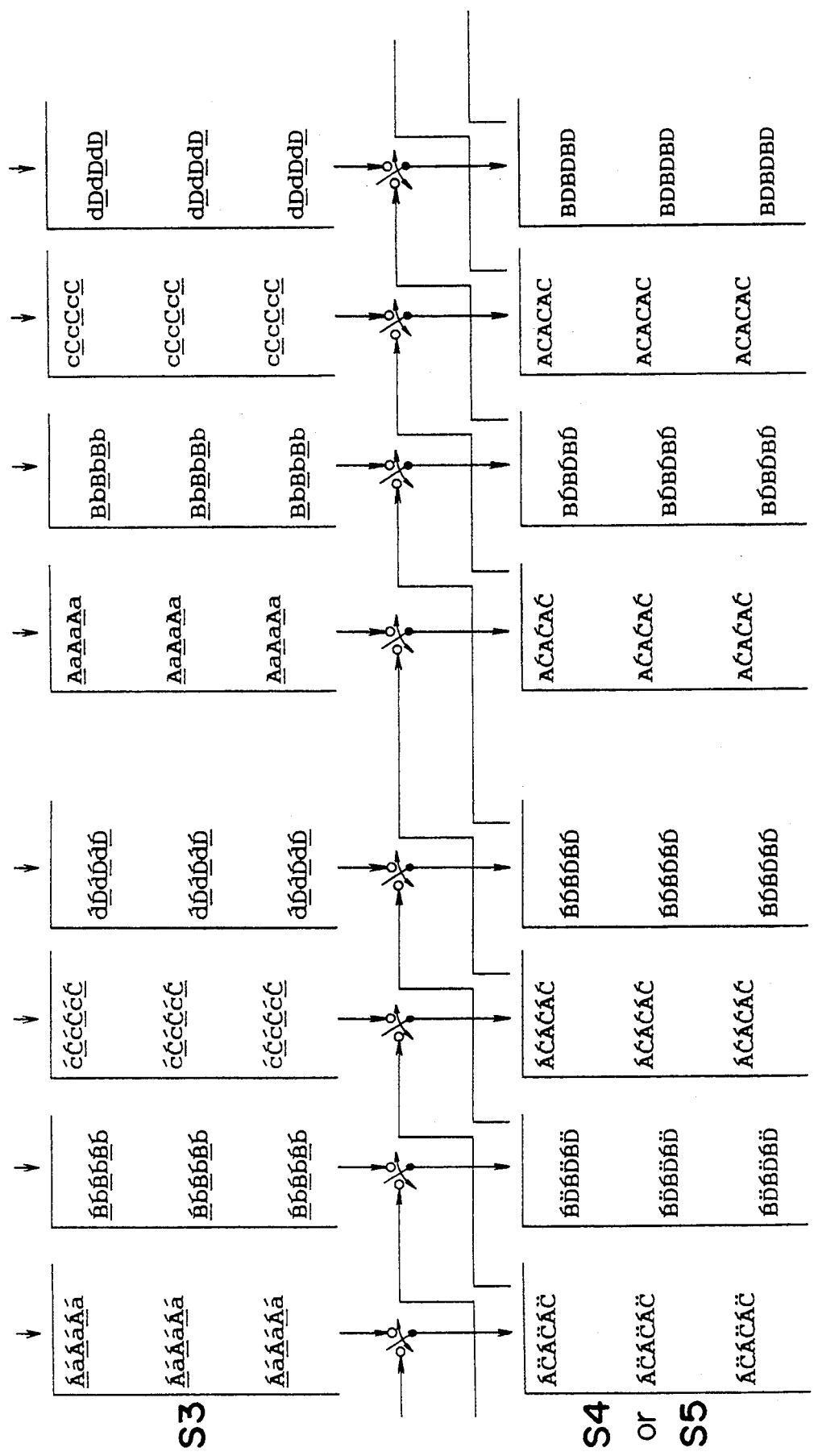
FIG. 4 is a partial raster image used to describe the operation of the modification of FIG. 3.

In the first embodiment above inter-frame interpolation is accomplished by the checkerboard replacement, but in the first modification, the inter-frame interpolation is accomplished by a stripe replacement as will be described below with reference to FIG. 4. FIG. 4 should be taken together with FIG. 2a to form a complete figure.

According to the modification of FIG. 3, the signal selector 4 is switched by a switch control signal Sb shown in FIG. 1b.

In response to the switch control signal Sb, the signal selector 4 connects blocks 3 and 5 when signal Sb is HIGH, and connects blocks 6 and 5 when signal Sb is LOW. Thus, in FIG. 4, data with underline in signal S3 are selected by the signal selector 4 and are applied to field memory 5, and the remaining signal for filling the space between the selected underlined data are selected from one frame previous data as stored in field memory 6. By alternately combining the present pixel data and one frame previous pixel data by selector 4, a new combined signal S4 is stored in memory 5. Thus, every other pixel positions in signal S3, as black stripes in a black-and-white stripe pattern, are replaced in the frame offset manner. Such a replacement is herein referred to as a stripe replacement.

In this first modification, however, substitution to the previous frame signal is done using only the frame offset relationship, i.e., a stripe replacement, in order to simplify control of the signal selector 4. This operation is described below with reference to the raster diagram in FIG. 4.

It would seem that more faithful image reproduction is possible with this first modification than the first embodiment described above because this inter-frame interpolation process results in a signal filled with sampling points. In practice, however, this causes distortion in diagonal lines. This is because extracting pixels on a stripe for inter-frame interpolation immediately after extracting every other scan line in the scan line number conversion circuit 3 reintroduces aliasing.

Figure 5:
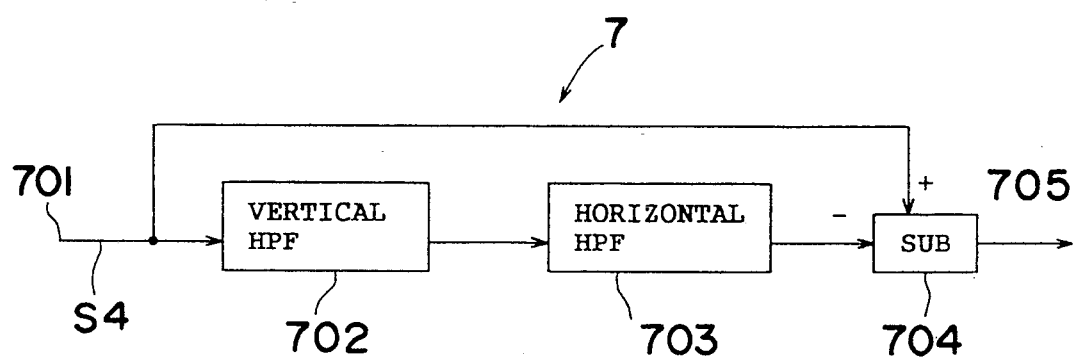
FIG. 5 is a block diagram of the diagonal high frequency cut-off filter of the modification of FIG. 3.

The diagonal high frequency cut-off filter 7 is shown in detail in FIG. 5. Specifically, input signal S4 applied to the input terminal 701 are input to the vertical high frequency pass filter (vertical HPF) 702 and subtracter 704, which subtracts the horizontal high pass filter (horizontal HPF) 703 output signal from the signal supplied to the input terminal 701, and the difference signal is output through the output terminal 705.

The operation of this diagonal high frequency cut-off filter 7 is described below. The bandpass characteristics of the vertical HPF 702 pass images having vertical frequencies of 525/8 (cycle per height) or greater. A typical image which has a vertical frequency 525/8

(cph) is a horizontal stripe image having a stripe width equal to 525/8 horizontal lines. As a result, only the signal component exceeding a 525/8 (cph) vertical frequency in the signal supplied to the input terminal 701 is supplied to the horizontal HPF 703.

The bandpass characteristics of the horizontal HPF 703 pass fs/4 (MHz) horizontal frequency signal components where fs is the signal processing frequency. The vertical HPF 702 output signal is therefore further filtered, and only the high frequency component exceeding a horizontal frequency of fs/4 (MHz) is input to the subtracter 704. In other words, by filtering the input signal through the vertical HPF 702 and horizontal HPF 703, signal components with a minimum vertical frequency of 525/8 (cph) and a minimum horizontal frequency of fs/4 (MHz) are input to the subtracter 704.

By subtracting the horizontal HPF 703 output signal from the signal supplied directly from the input terminal 701, the signal supplied by the subtracter 704 to the output terminal 705 is the signal selector 4 output signal S4 (which is input to the input terminal 701) from which the diagonal high frequency component exceeding a vertical frequency of 525/8 (cph) and a horizontal frequency of fs/4 (MHz) has been removed.

Figure 6:
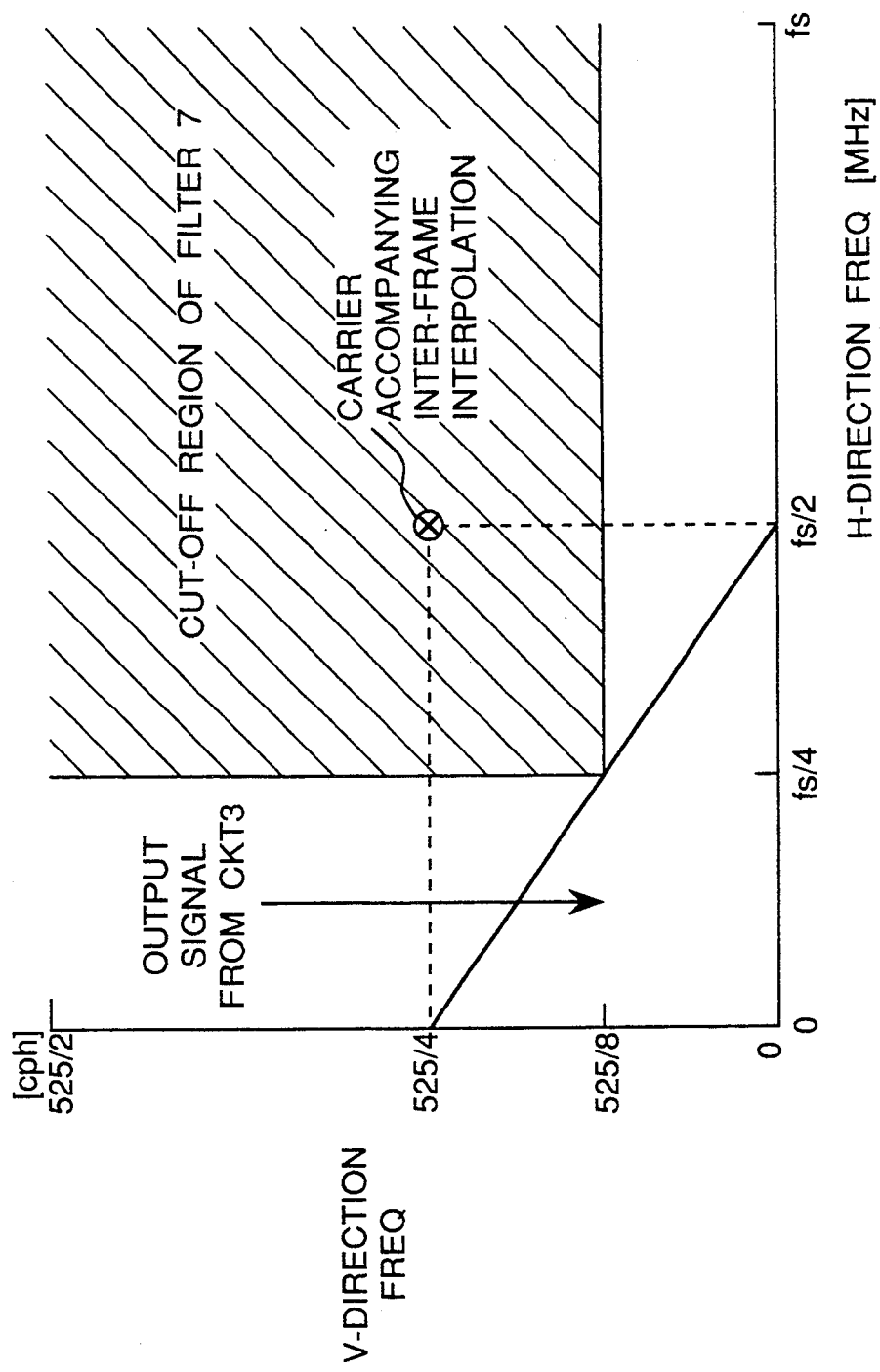
FIG. 6 is a graph of the cut-off characteristics of the diagonal high frequency cut-off filter of the first modification.

The relationship between cut-off characteristics of the diagonal high frequency cut-off filter 7 described above and the carrier accompanying inter-frame interpolation to a stripe replacement, and the band width of the scan line number conversion circuit 3 output signal shown against the horizontal-vertical 2D frequency region are shown in FIG. 6.

As shown in FIG. 6, aliasing accompanying stripe replacement inter-frame interpolation is concentrated around this vertical 525/8 (cph) and horizontal fs/4 (MHz) frequency ("⊗" in FIG. 6). There is no diagonal high frequency component in the scan line number conversion circuit 3 output signal S3 in FIG. 6 because the bandwidth is limited by the intra-field interpolation circuit 2 preceding the scan line number conversion circuit 3. Using a diagonal high frequency cut-off filter 7 with a cut-off region as indicated by the shaded area in FIG. 6, aliasing around the vertical 525/8 (cph) and horizontal fs/4 (MHz) frequency ("⊗" in FIG. 6) can be removed, and interference with diagonal lines can be prevented.

Figure 7:
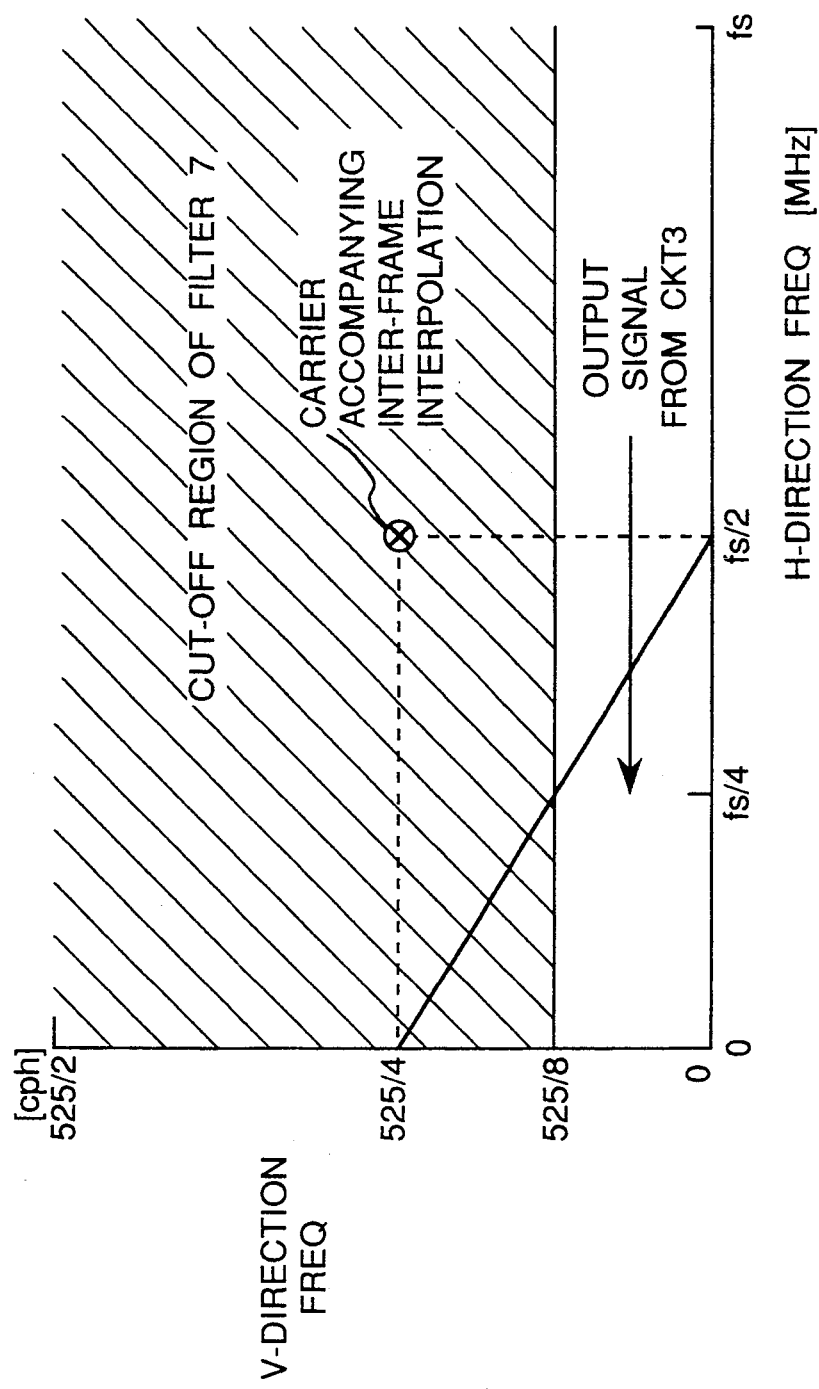
FIG. 7 is a graph of the cut-off characteristics of the vertical high frequency cut-off filter of the first modification.
Figure 8:
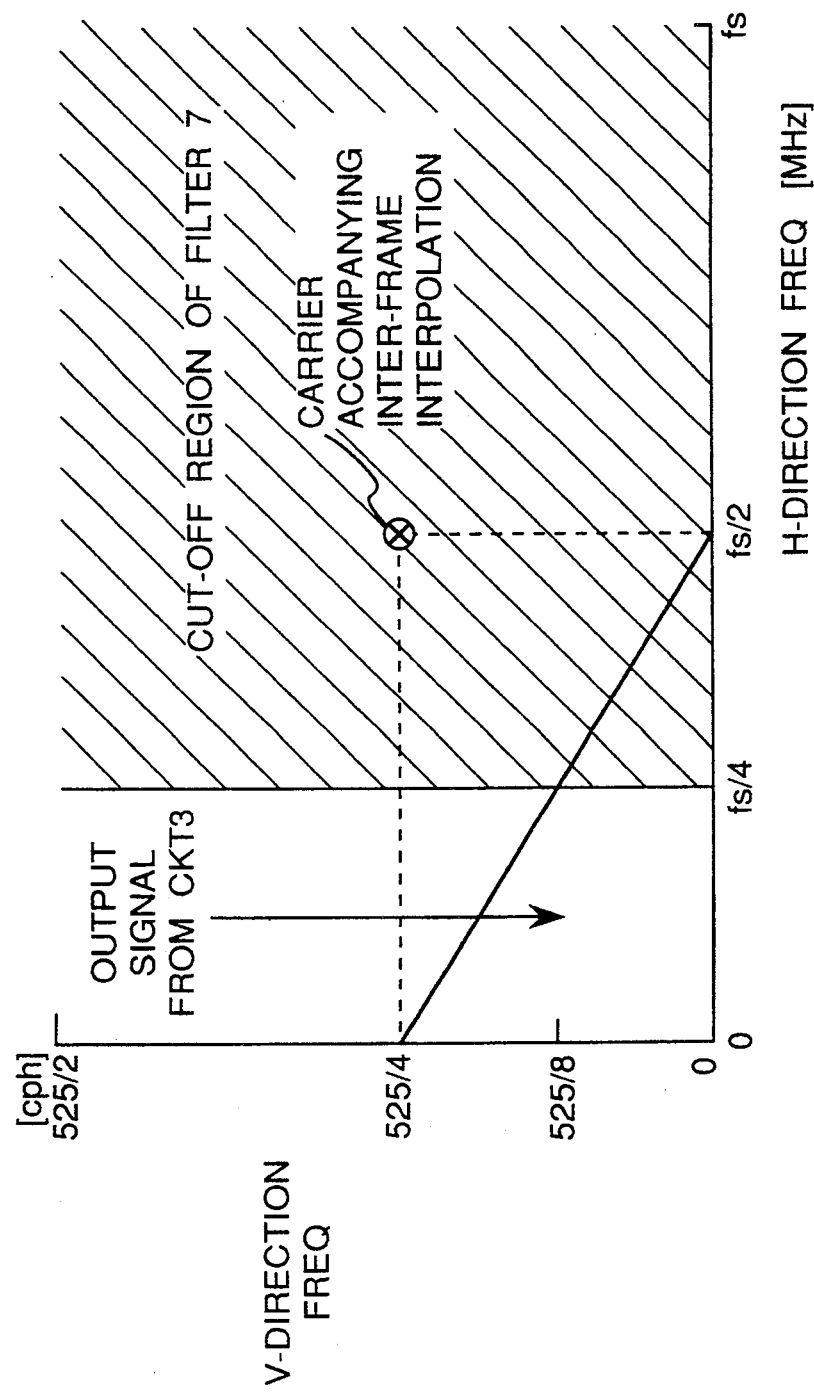
FIG. 8 is a graph of the cut-off characteristics of the horizontal high frequency cut-off filter of the first modification.

To further simplify the construction, a vertical high-frequency cut-off filter with cut-off characteristics as shown in FIG. 7, or a horizontal high frequency cut-off filter with cut-off characteristics as shown in FIG. 8 can be used. In other words, FIG. 7 is obtained when horizontal HPF 703 is eliminated, and FIG. 8 is obtained when vertical HPF 702 is eliminated. As will be known from FIGS. 7 and 8, aliasing accompanying inter-frame interpolation around the vertical 525/8 (cph) and horizontal fs/4 (MHz) frequency component can be removed, and interference does not occur in the diagonal lines. However, this process also removes signal components, and either vertical or horizontal resolution is degraded. It is therefore preferable to remove only the diagonal high frequency component.

The mixer 11 then mixes the stationary area signal (from which the diagonal high frequency component has been removed by the diagonal high frequency cut-off filter 7 from the signal selector 4 output signal) with the signal for the moving area processed by intra-field interpolation only (the scan line number conversion circuit 3 output signal) according to the amount of movement detected by the motion detection circuit 8.

Any aliasing interference in the frame is thus removed without distortion of diagonal line components, and a standard television signal free of image degradation, including ghosting of moving images, is supplied to the output terminal 10.

Figure 9:
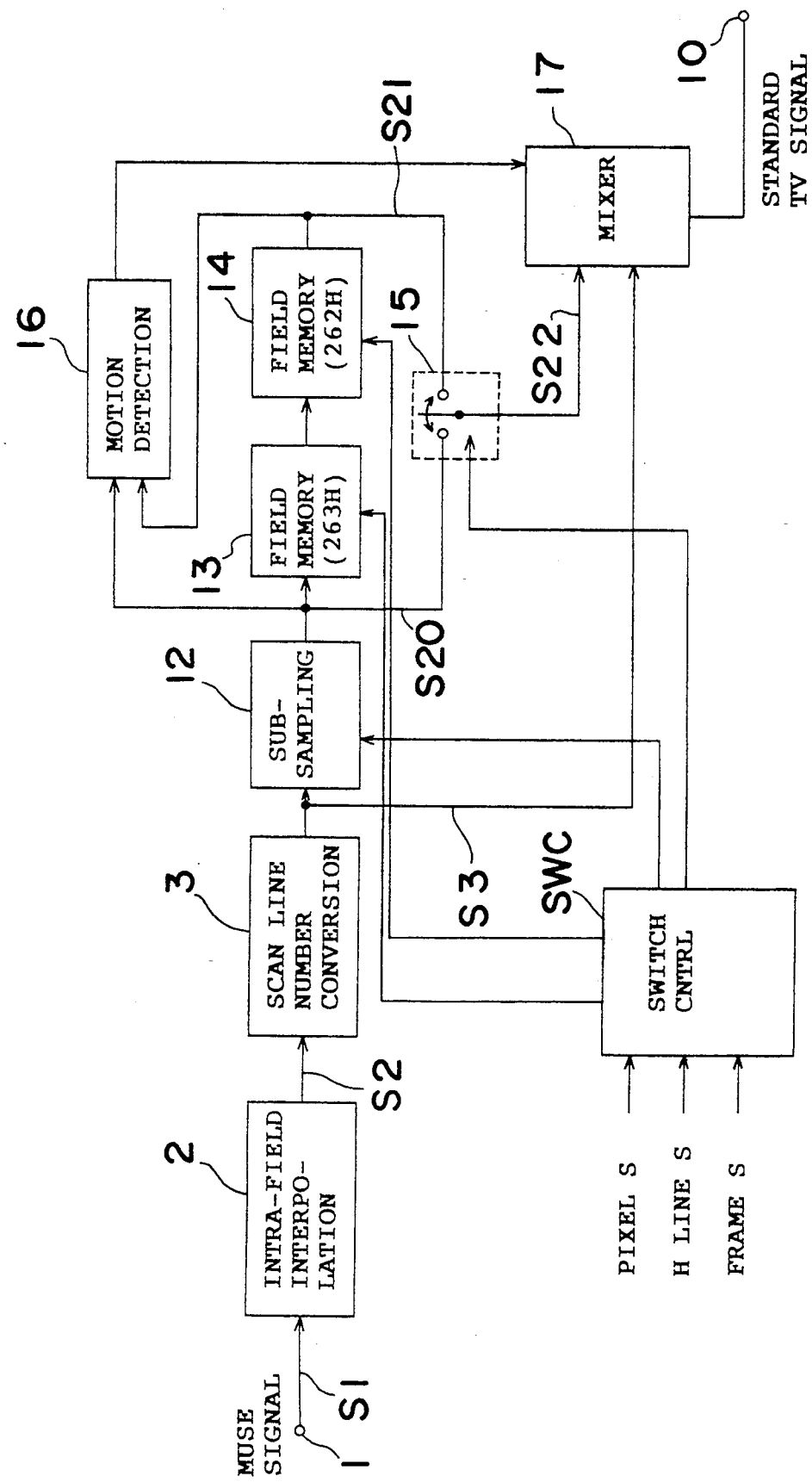
FIG. 9 is a block diagram of a video signal converting apparatus according to a second modification of the first embodiment of the invention.

FIG. 9 is a block diagram of a video signal converting apparatus according to a second modification of the first embodiment described above. Like components in this and the first embodiment shown in FIG. 1a are identified by the same reference numerals, and further description is omitted below.

Referring to FIG. 9, this second modification comprises a MUSE signal input terminal 1, an intra-field interpolation circuit 2, a scan line number conversion circuit 3, a sub-sampling circuit 12 for sampling the pixels of the scan line number-converted signal to a checkerboard pattern, field memories 13, 14, a signal selector 15 for inserting the signal delayed one frame period by the field memories 13, 14 to the pixel positions sampled by the sub-sampling circuit 12, a motion detection circuit 16, mixer 17, and standard TV signal output terminal 10.

Figure 10:
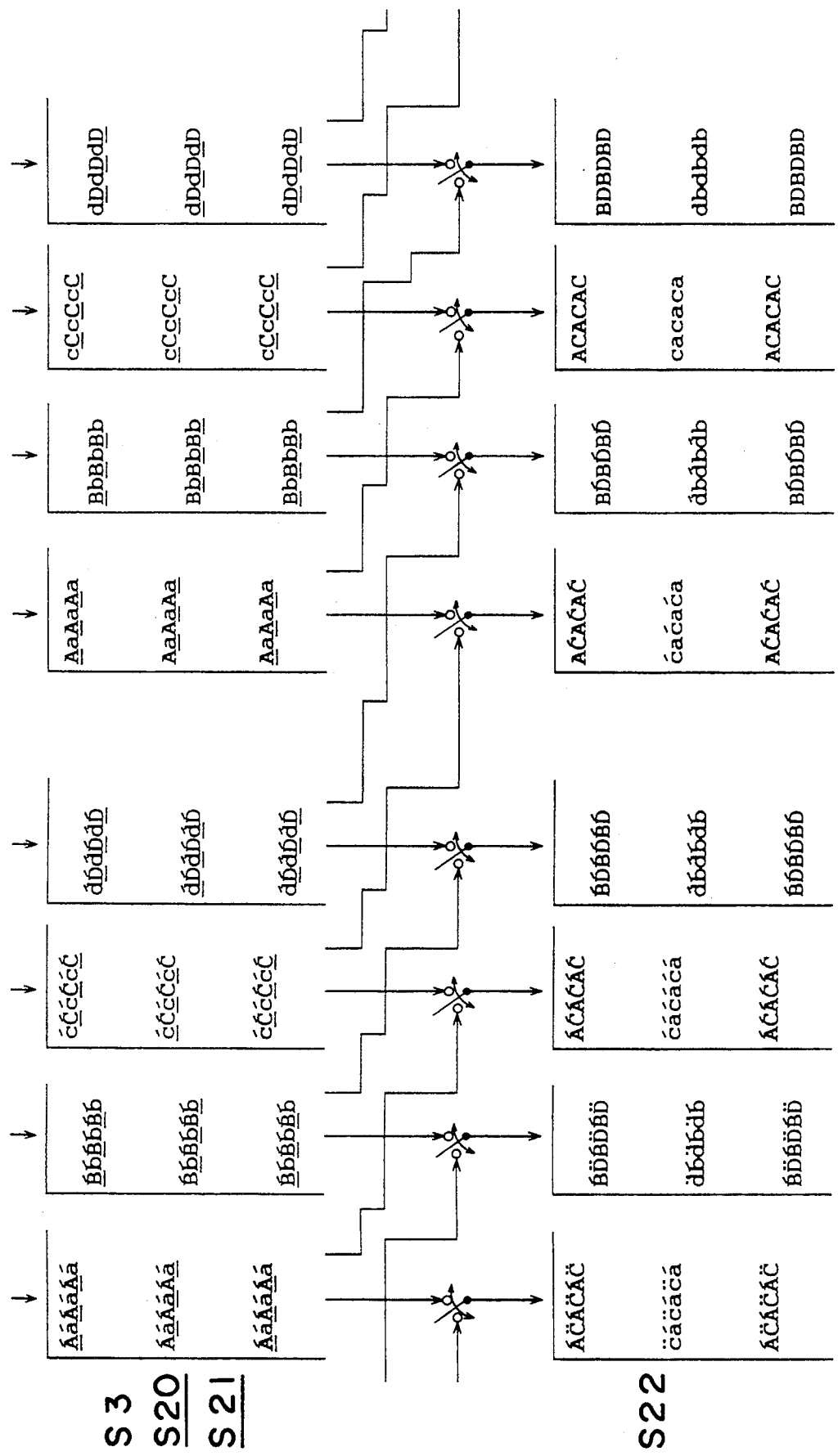
FIG. 10 is a partial raster image used to describe the operation of the second modification.

The operation of this modification is described below with reference to FIG. 10. The sub-sampling circuit 12 samples the pixels (underlined pixels in FIG. 10, S20) for the checkerboard replacement from the signal converted to 525 scan lines by the scan line number conversion circuit 3 after interpolation by the intra-field interpolation circuit 2. The pixel data supplied to the serially connected field memories 13, 14 is therefore half the output signal from the scan line number conversion circuit 3. The capacity of the field memories 13, 14, which are operated at a ½ frequency of those used for the memories 5 and 6 in the first embodiment, is therefore half that of the memories 5 and 6 in FIG. 1a described above, and thus less than ¼ that of the prior art.

The signal selector 15 replaces the non-underlined character pixels (FIG. 10, S20) in sampled pixels by the sub-sampling circuit 12 with the one frame delayed underlined pixels, and produces an output signal S22. As a result of this inter-frame interpolation process, the aliasing component caused by inter-frame offset sub-sampling can be removed.

The motion detection circuit 16 then detects motion in the image by comparing the image from the sub-sampling circuit 12 output signal S20 and the image from the field memory 14.

The mixer 17 then mixes the inter-frame interpolated stationary area signal (i.e., the signal selector 15 output signal) and the moving area signal, which is processed by intra-field interpolation only and output by the scan line number conversion circuit 3, according to the amount of movement detected by the motion detection circuit 16 to supply a standard TV signal free of inter-frame aliasing interference and ghosting in moving images to the output terminal 10.

The first and second modifications of the invention as described above can thus remove inter-frame aliasing interference caused by inter-frame offset sub-sampling using less memory capacity than required by methods of the prior art by applying inter-frame interpolation processing to substitute half of the pixels in the current field into the signal of the previous frame after converting the band-width compressed HDTV signal to the same number of scan lines used in the conventional television signal.

Figure 11:
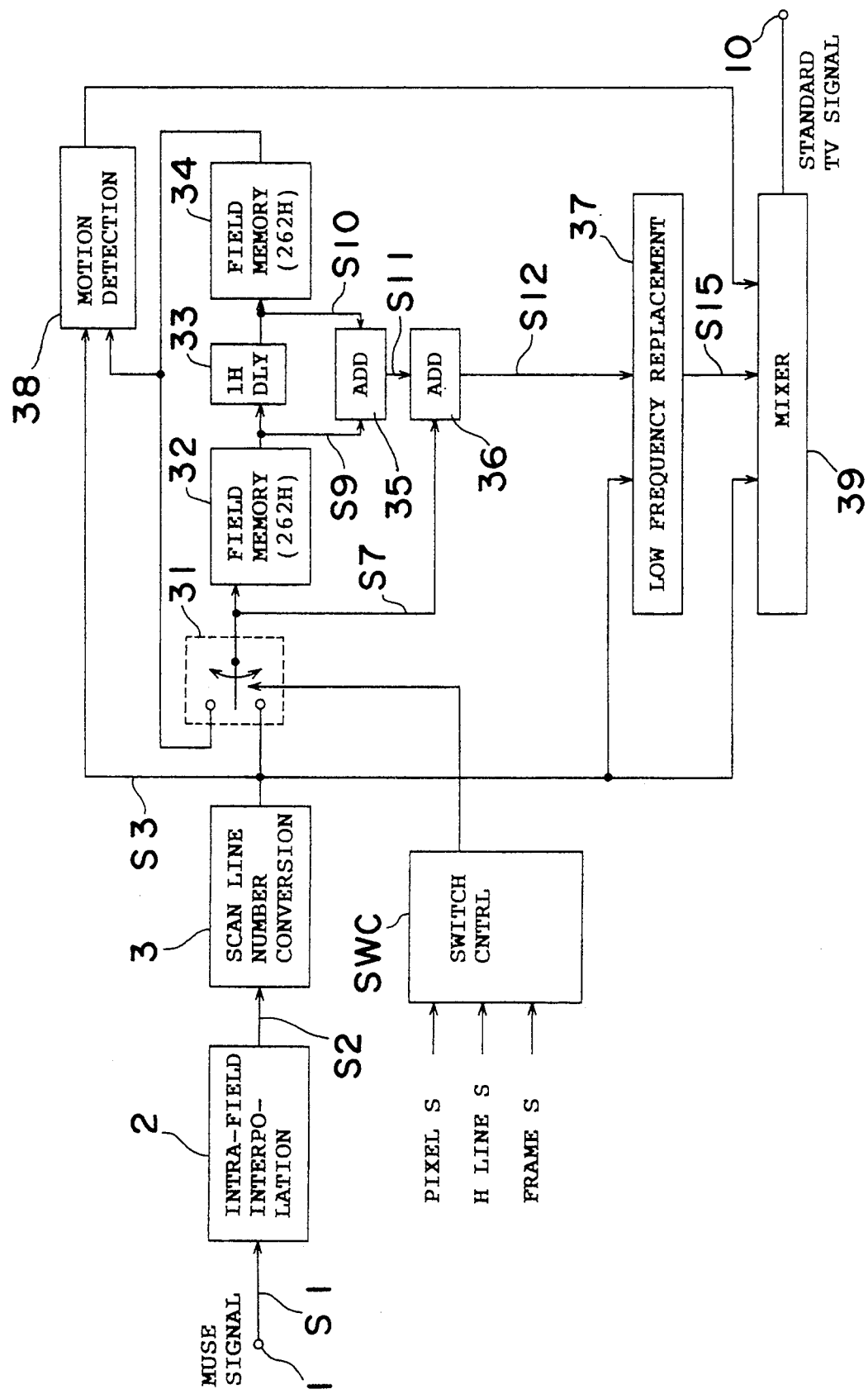
FIG. 11 is a block diagram of a video signal converting apparatus according to the second embodiment of the invention.

FIG. 11 is a block diagram of a video signal converting apparatus according to the second embodiment of the invention.

As shown in FIG. 11, this video signal conversion apparatus comprises a MUSE signal input terminal 1, an intra-field interpolation circuit 2, a scan line number conversion circuit 3, a signal selector 31, field memories 32, 34, a line memory 33, inter-line averaging circuit 35, inter-field averaging circuit 36, low frequency replacement circuit 37, motion detection circuit 38, mixer 39, and standard TV signal output terminal 10.

The signal selector 31 inserts the signal delayed one frame period by the field memories 32, 34 and line memory 33 into the scan line number conversion circuit 3 output signal.

The inter-line averaging circuit 35 formed by an adder averages the output signals of the one field memory 32 with the output signal from the line memory 33. The inter-field averaging circuit 36 formed by an adder takes an inter-field averaging between the signal selector 31 output signal and the inter-line averaging circuit 35 output signal.

The low frequency replacement circuit 37 replaces the low frequency component of the scan line number conversion circuit 3 output signal with the low frequency component of the inter-field averaging circuit 36 output signal.

The operation of a video signal conversion apparatus according to this second embodiment is described below in comparison with the operation of the first embodiments and related modifications above.

The MUSE signal S1 input to the MUSE signal input terminal 1 is processed by the intra-field interpolation circuit 2, scan line number conversion circuit 3, signal selector 31, field memories 32, 34, and line memory 33 as in the first embodiments above, resulting in a signal with the same number of scan lines in a standard television signal and pixels from the previous frame inserted in a checkerboard replacement between the pixels of the current field.

The field memory 32 delays the signal selector 31 output signal S7 one field period (262 horizontal scanning period), and supplies the delayed signal to the line memory 33 and the inter-line averaging circuit 35.

The line memory 33 further delays the signal selector 31 output signal S7 one horizontal scanning period, and supplies the delayed signal to the next field memory 34 and the inter-line averaging circuit 35.

The inter-line averaging circuit 35 obtains the average of the field memory 32 output signal S9 and the line memory 33 output signal S10, and supplies the average signal to the inter-field averaging circuit 36.

The inter-field averaging circuit 36 obtains the average of the signal selector 31 output signal S7 and the inter-line averaging circuit 35 output signal S11, and outputs the result to the low frequency replacement circuit 37.

Figure 12:
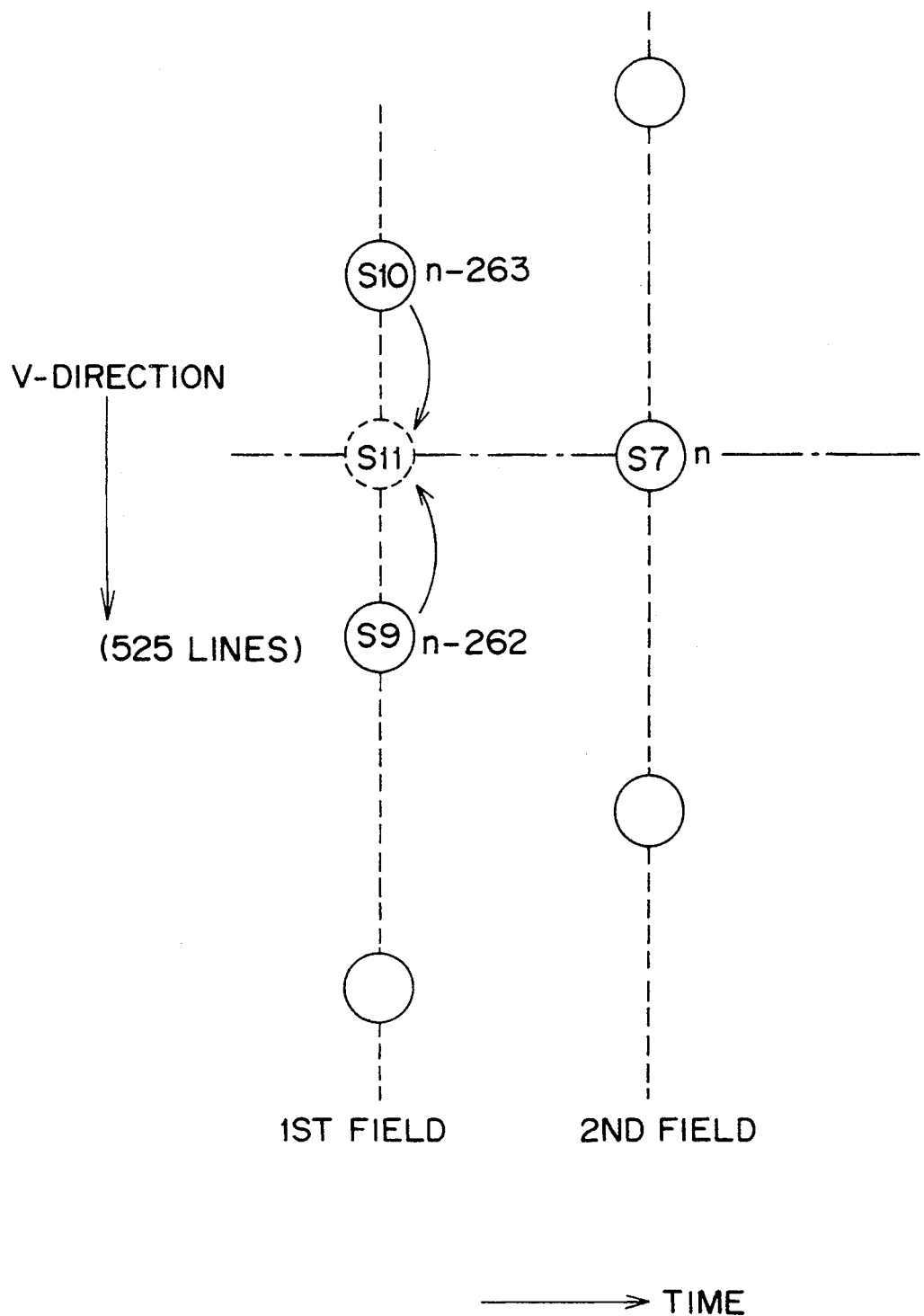
FIG. 12 is a scan line diagram used to describe the operation of the inter-field averaging circuit of the second embodiment.

As shown in FIG. 12, there is a one field period (262 horizontal scanning period) time difference between the signal selector 31 output signal S7 and field memory 32 output signal S9, and the center positions of the scan lines do not match.

If signal S7 is assumed to be the n-th line, signal S9 is line n-262 in the previous field (262 horizontal scanning period), and the line memory 33 output signal S10 is line n-263 in the previous horizontal scanning period. The respective scan line positions are thus as shown in FIG. 12.

The inter-line averaging circuit 35 obtains the average of the field memory 32 output signal S9 and the line memory 33 output signal S10 to generate the output signal S11. The scan line center of the inter-line averaging circuit 35 output signal S11 at this time will be the same as output signal S7 as shown in FIG. 12, enabling inter-field averaging of signals S7 and S11 by the inter-field averaging circuit 36.

By applying inter-field averaging to the signal in which the aliasing component caused by inter-frame offset sub-sampling is restored by inter-frame interpolation at the transmission side, field aliasing interference, i.e., the inter-field flicker component, can be removed.

Figure 13:
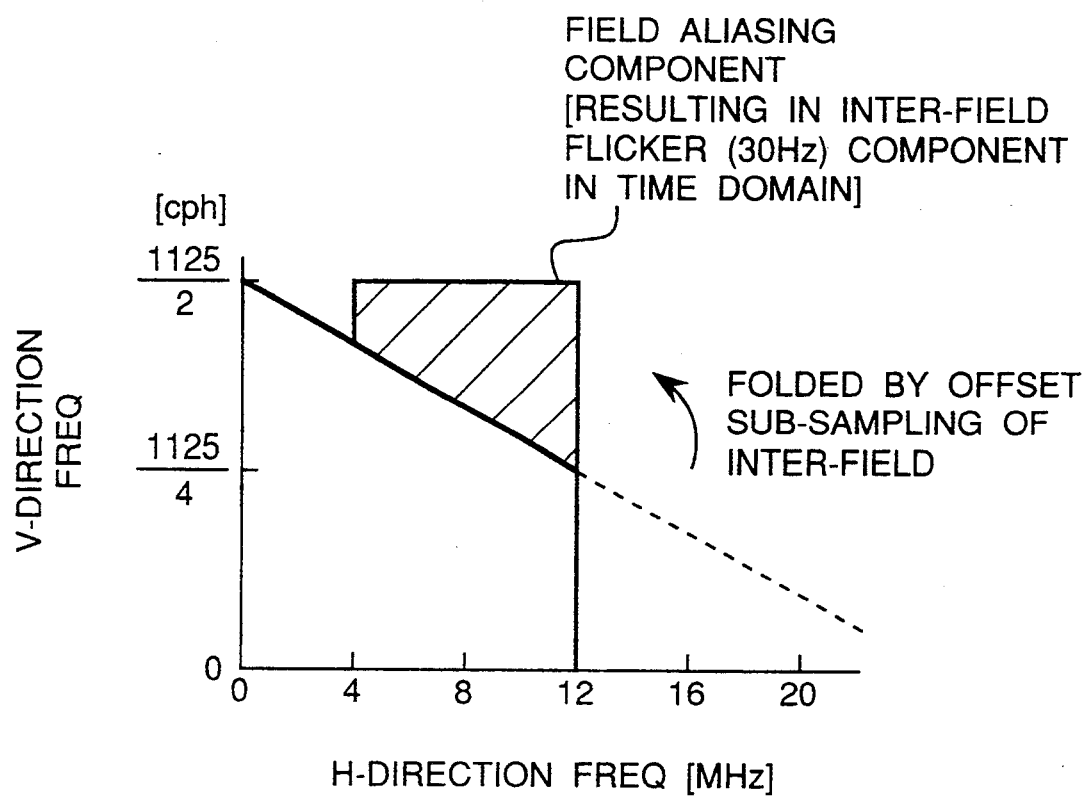
FIG. 13 is a graph of the horizontal - vertical frequency spectrum of the MUSE signal.

The inter-frame interpolated MUSE signal plotted in the horizontal-vertical 2D frequency space is as shown in FIG. 13. As shown in FIG. 13, the field aliasing component caused by offset sub-sampling exists in the high frequency region of the horizontal frequency (min. 4 MHz in the MUSE signal rate before scan line conversion).

The low frequency replacement circuit 37 replaces the low frequency component of the scan line number conversion circuit 3 output signal S3 with the low frequency component of the inter-field averaging circuit 36 output signal S12, and outputs the result to the mixer 39.

Figure 14:
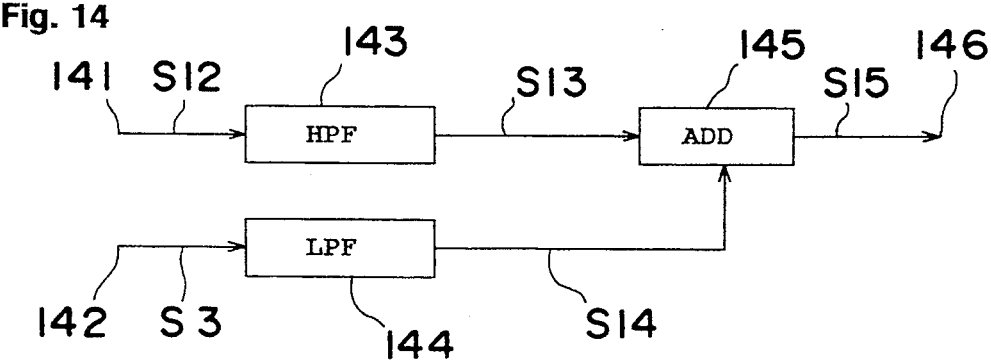
FIG. 14 is a block diagram of the low frequency replacement circuit in the second embodiment.

The low frequency replacement circuit 37 may be configured as shown in FIG. 14, comprising an input terminal 141 through which the inter-field averaging circuit 36 output signal S12 is input, a second input terminal 142 through which is input the scan line number conversion circuit 3 output signal S3, a high-pass filter 143 for filtering out the horizontal low frequency component containing the field aliasing component, a low-pass filter 144, an adder 145, and output terminal 146. The characteristics of the LPF 144 are the inverse of the HPF 143 characteristics.

The HPF 143 extracts only the horizontal high frequency component (the component equivalent to min. 4 MHz in FIG. 13) of the input signal S12, in input to the input terminal 141 after removing the field aliasing interference The low frequency component (equivalent to 0–4 MHz in FIG. 13) is thus removed from the signal S13 supplied to the adder 145.

The LPF 144, however, extracts only the horizontal low frequency component (equivalent to 0–4 MHz in FIG. 13) of the intra-field interpolated input signal S3, and inputs a signal S14 from which the high frequency component (equivalent to min. 4 MHz in FIG. 13) has been removed to the adder 145. The adder 145 adds the two input signals S13 and S14, and outputs signal S15 to the output terminal 146. As a result, the high frequency component of the output signal S15 is the component from which field aliasing interference has been removed by inter-field averaging, and the low frequency component is the component processed only by intra-field interpolation.

Field aliasing interference removal can be completed with higher precision because inter-field averaging is applied to only the high frequency component of the horizontal frequency in which aliasing interference is present as a result of the low frequency replacement process.

More specifically, the field aliasing interference component is removed from the flicker component of the field, and field averaging is not applied to the component resulting from interlaced scanning (primarily the component present in the horizontal low frequency and vertical high frequency areas). As a result, vertical resolution is not degraded.

The motion detection circuit 38 detects image motion from the scan line number conversion circuit 3 output signal S3 and the signal S8 delayed one frame by the field memories 32, 34 and line memory 33.

The mixer 39 mixes the stationary area signal S15 (i.e., the low frequency replacement circuit 37 output signal from which both frame and field aliasing interference have been removed) and the moving area signal S3 (i.e., the scan line number conversion circuit 3 output signal processed by intra-field processing only) according to the amount of motion detected by the motion detection circuit 38, and outputs the result to the standard TV signal output terminal 10.

This embodiment of the invention thus obtains a standard TV signal from which both frame and field aliasing interference have been removed without degrading the vertical resolution.

Figure 15:
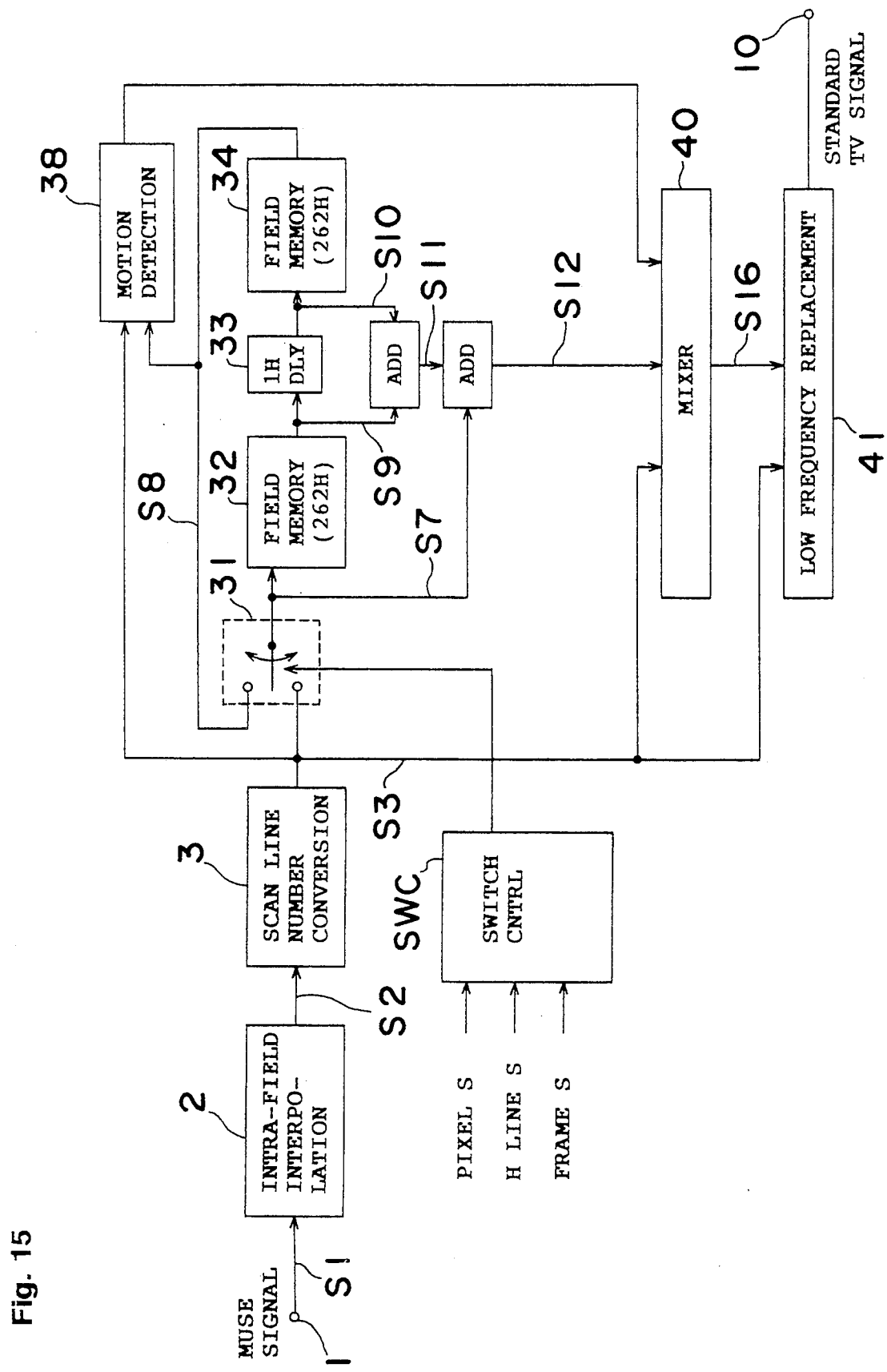
FIG. 15 is a block diagram of a video signal converting apparatus according to a first modification of the second embodiment of the invention.

FIG. 15 is a block diagram of a video signal converting apparatus according to a first modification of the second embodiment of the invention. This modification differs from the second main embodiment described by providing a low frequency replacement circuit 41 after the mixer 40. This low frequency replacement circuit 41 is for preventing vertical resolution degradation accompanying inter-field averaging. All other components are identical and are identified by the same reference numerals in FIGS. 11 and 15.

In this modification of the invention, the mixer 40 mixes the stationary area signal S12 (output from the inter-field averaging circuit 36 after removal of both frame and field aliasing interference) and the moving area signal S3 (intra-field processed only and output from the scan line number conversion circuit 3) according to the amount of movement detected by the motion detection circuit 38, and outputs the result to the low frequency replacement circuit 41.

The low frequency replacement circuit 41 replaces the low frequency component of the scan line number conversion circuit 3 output signal S3 with the low frequency component of the output signal S16 from the mixer 40, and supplies a standard TV signal to the output terminal 10.

Therefore, as in the first modification of this second embodiment above, a standard television signal free of both frame and field aliasing interference can be obtained without degrading the vertical resolution.

Figure 16:
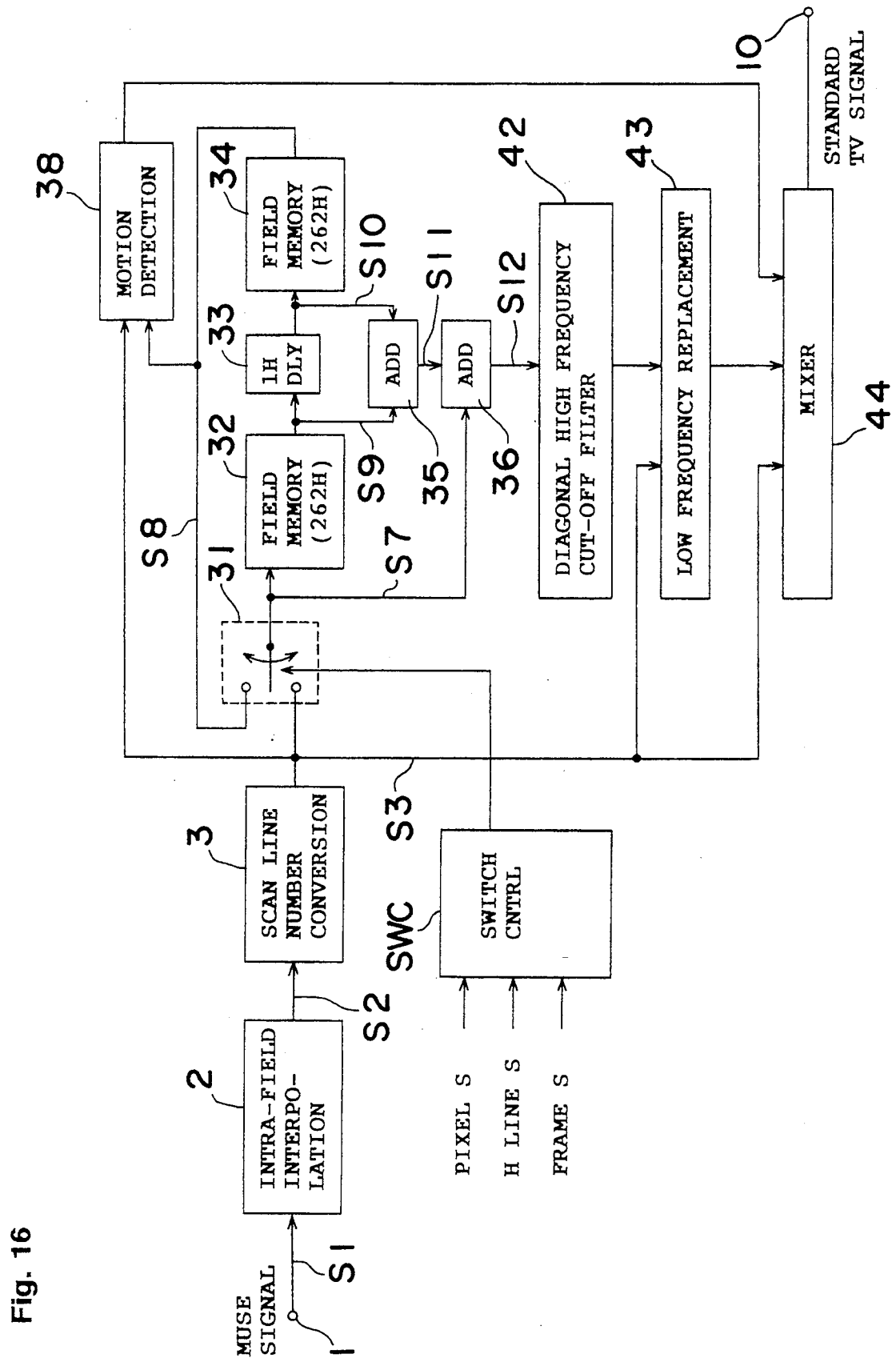
FIG. 16 is a block diagram of a video signal converting apparatus according to a second modification of the second embodiment of the invention.

FIG. 16 is a block diagram of a video signal converting apparatus according to a second modification of the second embodiment of the invention. This modification differs from the second main embodiment described above by providing a diagonal high frequency cut-off filter 42 between the inter-field averaging circuit 36 and low frequency replacement circuit 43. This diagonal high frequency cut-off filter 42 is for preventing distortion of diagonal lines during stripe replacement inter-frame interpolation. All other components are identical and are identified by the same reference numerals in FIGS. 11 and 16.

In this modification, the signal selector 31 inserts the output signal of the field memory 34 in a stripe replacement manner for inter-frame interpolation of the scan line number conversion circuit 3 output signal.

This inter-frame interpolation in a stripe replacement manner introduces new aliasing, which results in a diagonal high frequency component. The diagonal high frequency cut-off filter 42 removes this diagonal high frequency component from the inter-field averaging circuit 36 output signal S12, from which both frame and field aliasing interference have been removed, and supplies the result to the low frequency replacement circuit 43.

The low frequency replacement circuit 43 replaces the low frequency component of the scan line number conversion circuit 3 output signal S3 with the low frequency component of the diagonal high frequency cut-off filter 42 output signal, and outputs to the mixer 44.

The mixer 44 mixes the stationary area signal, which is output from the low frequency replacement circuit 43 free of both frame and field aliasing interference without introducing diagonal line distortion or degrading the vertical resolution, and the moving area signal S3, which is processed by intra-field interpolation only and output by the scan line number conversion circuit 3, according to the amount of movement detected by the motion detection circuit 38, and supplies the mixed signal to the standard TV signal output terminal 10.

As a result, frame aliasing interference is removed without introducing diagonal line distortion, and as in the first description of this second modification above, a standard television signal free of field aliasing interference can be obtained without degrading the vertical resolution.

Figure 17:
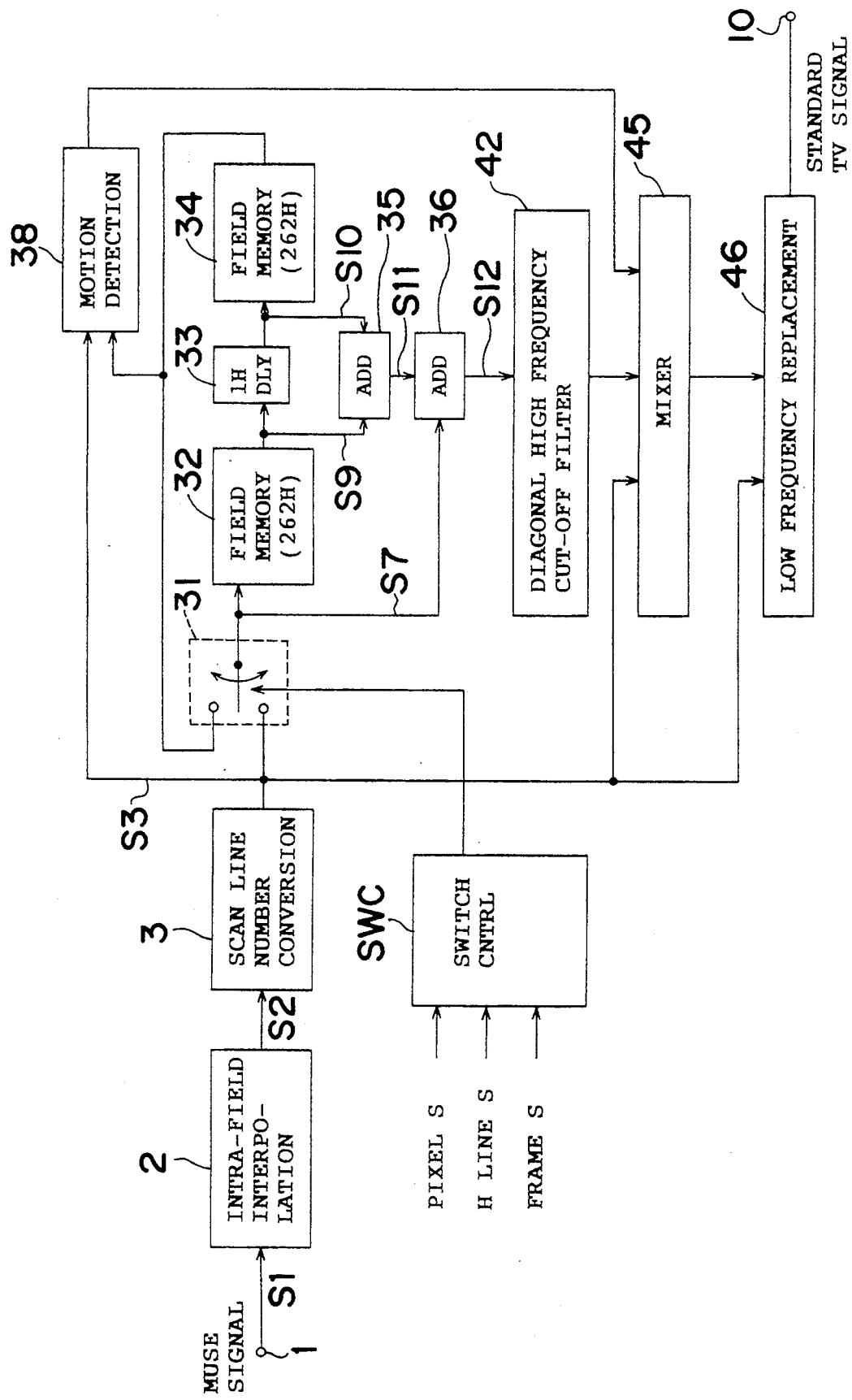
FIG. 17 is a block diagram of a video signal converting apparatus according to a third modification of the second embodiment of the invention.

FIG. 17 is a block diagram of a video signal converting apparatus according to a third modification of the second embodiment of the invention. This modification differs from the second modification described above by providing a low frequency replacement circuit 46 for preventing vertical resolution degradation caused by inter-field averaging after the mixer 45. All other components are identical and are identified by the same reference numerals in FIGS. 16 and 17.

In this modification, the mixer 45 mixes the stationary area signal, which is output from the diagonal high frequency cut-off filter 42 after removal of both frame and field aliasing interference without introducing diagonal line distortion, and the moving area signal, which is processed by intra-field interpolation only and output by the scan line number conversion circuit 3, according to the amount of movement detected by the motion detection circuit 38, and supplies the mixed signal to the low frequency replacement circuit 46.

The low frequency replacement circuit 46 replaces the low frequency component of the scan line number conversion circuit 3 output signal S3 with the low frequency component of the output signal from the mixer 45, and supplies a standard TV signal to the output terminal 10.

Therefore, as in the third modification of the second embodiment above, frame aliasing interference is removed without introducing diagonal line distortion, field aliasing interference is removed without degrading the vertical resolution, and a standard television signal is obtained.

FIG. 18 is a block diagram of a video signal converting apparatus according to a fourth modification of the second embodiment of the invention.

As shown in FIG. 18, this video signal conversion apparatus comprises a MUSE signal input terminal 1, an intrafield interpolation circuit 2, a scan line number conversion circuit 3, sub-sampling circuit 12 for sampling half of the current field data in the scan line number-converted signal in a checkerboard replacement manner, field memories 13, 14, 47, signal selectors 15, 48 for inserting the field signal delayed one frame to the pixel positions sampled by the sub-sampling circuit 12, an inter-field operating circuit 49 for inter-field averaging, a low frequency replacement circuit 50, motion detection circuit 51, mixer 52, and standard TV signal output terminal 10.

The operation of a video signal conversion apparatus according to this modification is described below.

The MUSE signal S1 input to the MUSE signal input terminal 1 is processed by the intra-field interpolation circuit 2, scan line number conversion circuit 3, sub-sampling circuit 12, field memories 13, 14, and first signal selector 15 to obtain an inter-frame interpolated signal S22 by the same processes executed by the second modification of the first embodiment described above (cf. FIG. 9).

The field memories 13, 14 delay the sub-sampling circuit 12 output signal S20 one frame, and input the frame-delayed signal S21 to the third field memory 47, This field memory 47 further delays the signal one field, and supplies the result to the second signal selector 48. It is to be noted that the signal selectors 15, 48 are controlled by switch control circuit SWC in a similar manner described above for the first embodiment.

As a result, the pixel data supplied to the serially connected field memories 13, 14, 47 is half that of the scan line number conversion circuit 3 output signal, and the storage capacity required for the field memories 13, 14, 47 is half that of the first, second, third, and fourth modifications of the second embodiment above.

Using the field memory 13 output signal S23, which is the sub-sampling circuit 12 output signal S20 delayed one field by the field memory 13, and the output signal S24 from the third field memory 47, the second signal selector 48 executes the same inter-frame interpolation process executed by the first signal selector 15. As a result, the second signal selector 48 output signal S25 is the first signal selector 15 output signal S22 delayed one field.

The inter-field operating circuit 49 average the fields using the delayed signals S22 and S25.

The inter-field operating circuit 49 may be comprised as shown in FIG. 19. The signal selector 48 output signal S25 is input to one input terminal 61, and the signal selector 15 output signal S22 is input to another input terminal 62. The input signals are then processed by the line memory 63, adders 64, 65, and output from the output terminal 66.

The input signals S22, S25 have interlaced scanning lines because of the one field time difference. This is illustrated in FIG. 20. If signal S22 is assumed to be the n-th line, then signal S25 is line n-262 from one previous field period (262 H), and signal S26 is line n-263 from one previous field period, resulting in the relationship between scan lines shown in FIG. 20.

The first adder 64 obtains the average of the line memory 63 input signal S25 and output signal S26, and outputs signal S27. The scan line center of the first adder 64 output signal S27 is the same as signal S22 as shown in FIG. 20.

The second adder 65 obtains the average of signals S22 and S27, and outputs the results S28 to the output terminal 66.

By means of these processes, the signal from which frame aliasing interference has been removed by inter-frame interpolation is averaged between fields, making it possible to remove the field aliasing interference causing inter-field flicker.

The low frequency replacement circuit 50 substitutes the low frequency component of the inter-field operating circuit 49 output signal S28 into the scan line number conversion circuit 3 output signal S22, and outputs to the mixer 52.

The motion detection circuit 51 detects image motion from the sub-sampling circuit 12 output signal S20, the field-delayed sub-sampling circuit 12 output signal S23, and the frame-delayed signal S24.

The mixer 52 mixer the stationary area signal output from the low frequency replacement circuit 50 and the moving area signal processed by intra-field interpolation only by the scan line number conversion circuit 3 according to the detected amount of motion, and supplies the mixed signal to the standard TV signal output terminal 10.

Thus, this fourth modification of the second embodiment of the invention can obtain a standard TV signal from which both frame and field aliasing interference have been removed using less memory capacity than required by the first to fourth descriptions of this second embodiment above.

Figure 21:
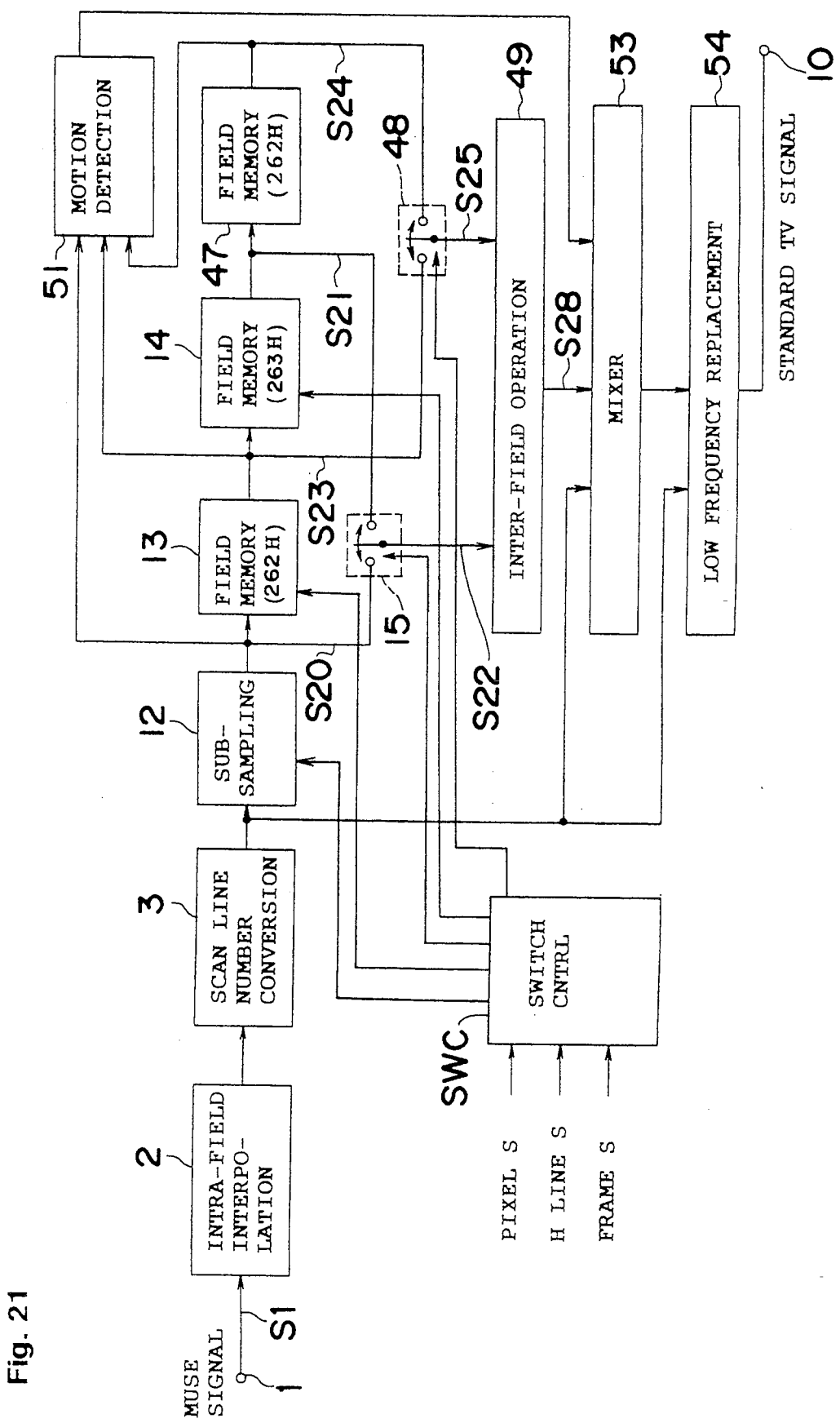
FIG. 21 is a block diagram of a video signal converting apparatus according to a fifth modification of the second embodiment of the invention.
Figure 22:
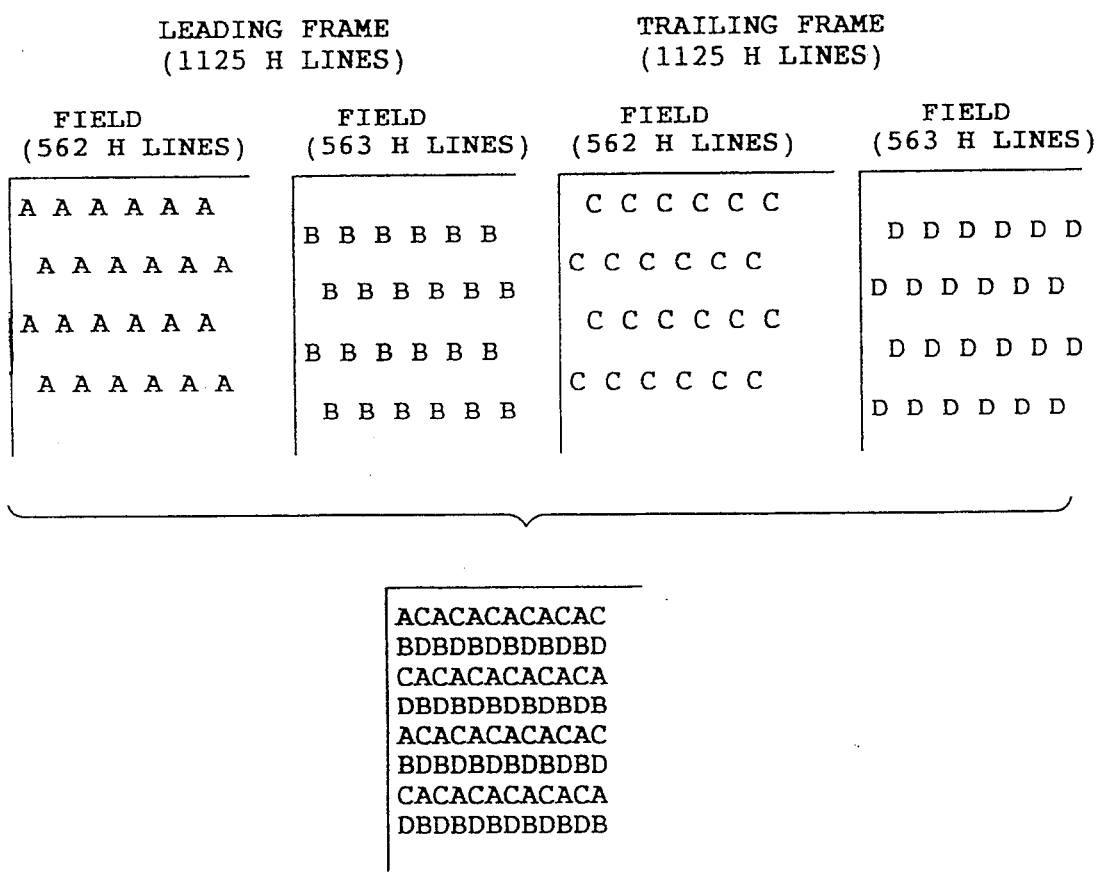
FIG. 22 is a scan line diagram used to describe the principle of the offset sub-sampling band-width compression method of the MUSE format.

FIG. 21 is a block diagram of a video signal converting apparatus according to a fifth modification of the second embodiment of the invention. This modification differs from the fourth modification described above by providing a low frequency replacement circuit 54 for preventing vertical resolution degradation caused by inter-field averaging after the mixer 53. All other components are identical and are identified by the same reference numerals in FIGS. 18 and 21.

In this modification, the mixer 53 mixes the stationary area signal S28, which is output from the inter-field operating circuit 49 after removal of both frame and field aliasing interference, and the moving area signal S3, which is processed by intra-field interpolation only and output by the scan line number conversion circuit 3, according to the amount of movement detected by the motion detection circuit 51, and supplies the mixed signal to the low frequency replacement circuit 54.

The low frequency replacement circuit 54 replaces the low frequency component of the scan line number conversion circuit 3 output signal S3 with the low frequency component of the output signal from the mixer 53, and supplies a standard TV signal to the output terminal 10.

Therefore, as in the fifth modification of this second embodiment above, frame aliasing interference is removed with less available memory, field aliasing interference is removed without degrading the vertical resolution, and a standard television signal is obtained.

It is to be noted that in each of the embodiments and modifications described above the pre-filter characteristics used for scan line sampling in the scan line number conversion circuit are included in the intra-field interpolation circuit, but an intra-field interpolation circuit performing no band-width limiting can be used and a pre-filter limiting the vertical band width can be provided before the scan line number conversion circuit.

In addition, the input signal to the motion detection circuit is not limited to the signal of the above descriptions, and any signal enabling detection of a difference in the time base can be used.

In the second modification of the first embodiment and the third and fourth modifications of the second embodiment the diagonal high frequency cut-off filter is provided after the inter-frame interpolation circuit, but it will be obvious from the relationship between the scan line number conversion circuit output signal band width and the cut-off characteristics of the diagonal high frequency cut-off filter that the diagonal high frequency cut-off filter can be provided before the inter-frame interpolation stage.

The second modification of the first embodiment and the third and fourth modifications of the second embodiment were further described as performing inter-frame interpolation in a checkerboard replacement only, but inter-frame interpolation in a stripe replacement is also possible. In this case, however, it is obviously necessary to make provision for removing the aliasing accompanying inter-frame interpolation in a stripe replacement as accomplished by the diagonal high frequency cut-off filter of the second modification of the first embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A video signal converting apparatus for converting a MUSE signal to a NTSC signal comprising:
   intra-field interpolation means for receiving an original MUSE pixel data and for inserting simulated pixel data between said original data to produce an interpolated signal;
   scan line number conversion means for extracting a horizontal line from a predetermined number of horizontal lines from said interpolated signal for producing an extracted signal;
   first memory means having a capacity for storing one field of the extracted signal;
   second memory means having a capacity for storing one field of the extracted signal and connected in series to said first memory means for sequentially receiving data from said first memory means and for producing a delayed signal; and
   selection means for alternatively selecting the pixel data from said scan line number conversion means and from said second memory means and for producing a combined signal which is provided to said first memory means.

2. A video signal converting apparatus as claimed in claim 1, wherein said selection means comprises a selection switch and a switch control means, said switch control means producing a switch control signal to said selection switch so as to select said extracted signal in line offset and frame offset manner.

3. A video signal converting apparatus as claimed in claim 1, wherein said first and second memory means have a capacity to store 263 and 262 horizontal lines, respectively.

4. A video signal converting apparatus as claimed in claim 1, further comprising:
   motion detection means for detecting, upon receipt of said extracted signal and said delayed signal, a degree of movement at each area in an image, and for producing a movement level signal indicative of an amount of movement of an image between said extracted and delayed signals; and
   mixer means for mixing in terms of amplitude, said extracted signal and said combined signal such that the rate of said extracted signal increases as the increase of said movement level signal.

5. A video signal converting apparatus as claimed in claim 4, further comprising a diagonal high frequency cut-off filter means inserted between said selection means and said mixer means for removing a diagonal high frequency component from said combined signal.

6. A video signal converting apparatus as claimed in claim 5, wherein said diagonal high frequency cut-off filter means comprises:
   a vertical high frequency pass filter for passing a predetermined vertical high frequency component;
   a horizontal high frequency pass filter for passing a predetermined horizontal high frequency component; and
   a subtracter for substracting said diagonal high frequency component extracted by the vertical high frequency pass filter and horizontal high frequency pass filter from said combined signal.

7. A video signal converting apparatus as claimed in claim 5, wherein said selection means comprises a selection switch and a switch control means, said switch control means producing a switch control signal to said selection switch so as to select said extracted signal in frame offset manner only.

8. A video signal converting apparatus for converting a MUSE signal to a NTSC signal comprising:
   intra-field interpolation means for receiving an original MUSE pixel data and for inserting simulated pixel data between said original data to produce an interpolated signal;
   scan line number conversion means for extracting a horizontal line from a predetermined number of horizontal lines from said interpolated signal for producing an extracted signal;
   sub-sampling means for sampling every other one of the pixel data in said extracted signal and for producing a sub-sampled signal;
   first memory means having a capacity for storing one field of the sub-sampled signal;
   second memory means having a capacity for storing one field of the sub-sampled signal and connected in series to said first memory means and for sequentially receiving data from said first memory means for producing a delayed signal; and
   selection means for alternately selecting the pixel data from said sub-sampling means and from said second memory means and for producing a combined signal.

9. A video signal converting apparatus as claimed in claim 8, wherein said sub-sampling means samples said extracted signal in line offset and frame offset manner.

10. A video signal converting apparatus as claimed in claim 8, further comprising:
    motion detection means for detecting, upon receipt of said sub-sampled signal and said delayed signal, a degree of movement at each area in an image, and for producing a movement level signal indicative of an amount of movement of an image between said sub-sampled and delayed signals; and
    mixer means for mixing in terms of amplitude, said extracted signal and said combined signal such that the rate of said extracted signal increases as the increase of said movement level signal.

11. A video signal converting apparatus for converting a MUSE signal to a NTSC signal comprising:
    intra-field interpolation means for receiving an original MUSE pixel data and for inserting simulated pixel data between said original data to produce an interpolated signal;

scan line number conversion means for extracting a horizontal line from a predetermined number of horizontal lines from said interpolated signal for producing an extracted signal;

first memory means having a capacity for storing one field of the extracted signal;

second memory means for storing one line data;

third memory means having a capacity for storing one field of the extracted signal, said first, second and third memory means connected in series for sequentially sending data therethrough, said third memory means producing a delayed signal;

selection means for alternately selecting the pixel data from said scan line number conversion means and from said third memory means and for producing a combined signal which is provided to said first memory means;

first averaging means for taking an average between input and output signals of said second delay means and for producing a first average signal; and second averaging means for taking an average between said first average signal and said combined signal and for producing a second average signal.

12. A video signal converting apparatus as claimed in claim 11, wherein said selection means comprises a selection switch and a switch control means, said switch control means producing a switch control signal to said selection switch so as to select said extracted signal in line offset and frame offset manner.

13. A video signal converting apparatus as claimed in claim 11, further comprising:
low frequency replacement means for replacing a low frequency component in said second average signal with a low frequency component in said extracted signal, and for producing a replaced signal.

14. A video signal converting apparatus as claimed in claim 13, further comprising:
motion detection means for detecting, upon receipt of said extracted signal and said delayed signal, a degree of movement at each area in an image, and for producing a movement level signal indicative of an amount of movement of an image between said extracted and delayed signals; and mixer means for mixing in terms of amplitude, said extracted signal and said replaced signal such that the rate of said extracted signal increases as the increase of said movement level signal.

15. A video signal converting apparatus as claimed in claim 11, further comprising:
motion detection means for detecting, upon receipt of said extracted signal and said delayed signal, a degree of movement at each area in an image, and for producing a movement level signal indicative of an amount of movement of an image between said extracted and delayed signals;

mixer means for mixing in terms of amplitude, said extracted signal and said second average signal such that the rate of said extracted signal increases as the increase of said movement level signal, and for producing a mixed signal; and low frequency replacement means for replacing a low frequency component in said mixed signal with a low frequency component in said extracted signal, and for producing a replaced signal.

16. A video signal converting apparatus as claimed in claim 14, further comprising a diagonal high frequency cut-off filter means inserted between said second averaging means and said low frequency replacement means for removing a diagonal high frequency component from said second average signal.

17. A video signal converting apparatus as claimed in claim 15, further comprising a diagonal high frequency cut-off filter means inserted between said second averaging means and said mixer means for removing a diagonal high frequency component from said second average signal.

18. A video signal converting apparatus for converting a MUSE signal to a NTSC signal comprising:
intra-field interpolation means for receiving an original MUSE pixel data and for inserting simulated pixel data between said original data to produce an interpolated signal;

scan line number conversion means for extracting a horizontal line from a predetermined number of horizontal lines from said interpolated signal for producing an extracted signal;

sub-sampling means for sampling every other one of the pixel data in said extracted signal and for producing a sub-sampled signal;

first memory means having a capacity for storing one field of the sub-sampled signal and for producing a first delayed signal;

second memory means having a capacity for storing one field of the sub-sampled signal and connected in series to said first memory means and for producing a second delayed signal;

third memory means having a capacity for storing one field of the sub-sampled signal and connected in series to said second memory means and for producing a third delayed signal;

first selection means for alternately selecting the pixel data from said sub-sampling means and from said second memory means and for producing a first combined signal;

second selection means for alternately selecting the pixel data from said first memory means and from said third memory means and for producing a second combined signal; and inter-field averaging means for taking an average between said first and second combined signals and for producing an inter-field average signal.

19. A video signal converting apparatus as claimed in claim 18, wherein said inter-field averaging means comprises:
line delay means for delaying one line of said second combined signal;

first adding means for calculating an average between input and output of said line delay means and for producing a first average signal; and second adding means for calculating an average between said first average signal and said first combined signal.

20. A video signal converting apparatus as claimed in claim 18, further comprising:
low frequency replacement means for replacing a low frequency component in said inter-field average signal with a low frequency component in said extracted signal, and for producing a replaced signal.

21. A video signal converting apparatus as claimed in claim 20, further comprising:
motion detection means for detecting, upon receipt of said extracted signal, said first delayed signal and said third delayed signal, a degree of movement at each area in an image, and for producing a movement level signal indicative of an amount of movement of an image between said extracted and delayed signals; and mixer means for mixing in terms of amplitude, said extracted signal and said replaced signal such that the rate of said extracted signal increases as the increase of said movement level signal.

22. A video signal converting apparatus as claimed in claim 18, further comprising:

motion detection means for detecting, upon receipt of said extracted signal, said first delayed signal and said third delayed signal, a degree of movement at each area in an image, and for producing a movement level signal indicative of an amount of movement of an image between said extracted and delayed signals;

mixer means for mixing in terms of amplitude, said extracted signal and said inter-field average signal such that the rate of said extracted signal increases as the increase of said movement level signal, and for producing a mixed signal; and low frequency replacement means for replacing a low frequency component in said mixed signal with a low frequency component in said extracted signal, and for producing a replaced signal.

* * * * *